United States Patent
Lindsey et al.

(10) Patent No.: US 12,388,958 B2
(45) Date of Patent: Aug. 12, 2025

(54) SYSTEM AND METHOD FOR DEBRIS DETECTION AND INTEGRITY VALIDATION FOR RIGHT-OF-WAY BASED INFRASTRUCTURE

(71) Applicant: LINDSEY FIRESENSE, LLC, Azusa, CA (US)

(72) Inventors: Keith E. Lindsey, La Cañada Flintridge, CA (US); John McCall, Rancho Cucamonga, CA (US)

(73) Assignee: LINDSEY FIRESENSE, LLC, Azusa, CA (US)

( * ) Notice: Subject to any disclaimer, the term of this patent is extended or adjusted under 35 U.S.C. 154(b) by 27 days.

(21) Appl. No.: 17/121,705

(22) Filed: Dec. 14, 2020

(65) Prior Publication Data

US 2021/0182569 A1    Jun. 17, 2021

Related U.S. Application Data

(60) Provisional application No. 63/067,169, filed on Aug. 18, 2020, provisional application No. 62/948,071, filed on Dec. 13, 2019, provisional application No. 62/948,081, filed on Dec. 13, 2019, provisional application No. 62/948,078, filed on Dec. 13, 2019.

(51) Int. Cl.
| | |
|---|---|
| H04N 7/18 | (2006.01) |
| G01W 1/02 | (2006.01) |
| G06V 20/52 | (2022.01) |
| H04N 23/695 | (2023.01) |

(52) U.S. Cl.
CPC .............. *H04N 7/181* (2013.01); *G01W 1/02* (2013.01); *G06V 20/52* (2022.01); *H04N 23/695* (2023.01)

(58) Field of Classification Search
CPC ....... G06V 20/52; G06V 10/751; G01W 1/02; H04N 5/23299; H04N 7/181; H04N 5/247

See application file for complete search history.

(56) References Cited

U.S. PATENT DOCUMENTS

| | | |
|---|---|---|
| 2006/0111841 A1 | 5/2006 | Tseng |
| 2011/0196536 A1 | 8/2011 | Phillips et al. |
| 2013/0191066 A1* | 7/2013 | Spillane ................. G01K 1/024 702/135 |
| 2014/0203181 A1 | 7/2014 | Rubenstein |

(Continued)

FOREIGN PATENT DOCUMENTS

CN    207652578 U    7/2018

OTHER PUBLICATIONS

International Search Report for corresponding International Application No. PCT/US2020/064965, filed Dec. 14, 2020, International Search Report dated Apr. 1, 2021 and mailed Apr. 22, 2021 (4 pgs.).

(Continued)

*Primary Examiner* — Richard A Hansell, Jr.
(74) *Attorney, Agent, or Firm* — Womble Bond Dickinson (US) LLP

(57) ABSTRACT

Systems and methods for debris detection and integrity validation for right-of-way based infrastructures are provided. Further, systems and methods for detection of electrical arcs and systems and methods for fire detection are provided. Further, a device for detection of weather conditions that is mountable on a power line is provided.

20 Claims, 15 Drawing Sheets

(56) References Cited

U.S. PATENT DOCUMENTS

| | | | | |
|---|---|---|---|---|
| 2015/0304487 | A1* | 10/2015 | Chaput | F16B 2/10 29/854 |
| 2016/0021434 | A1* | 1/2016 | Arakawa | H04Q 9/00 340/870.01 |
| 2016/0142637 | A1* | 5/2016 | Nuggehalli | G06V 10/24 348/333.02 |
| 2016/0171309 | A1* | 6/2016 | Hay | A61B 5/01 348/143 |
| 2017/0038406 | A1* | 2/2017 | Miller | G01P 1/026 |
| 2018/0197007 | A1* | 7/2018 | Thirion | H04L 9/3297 |
| 2019/0049951 | A1 | 2/2019 | Liu et al. | |
| 2019/0143827 | A1* | 5/2019 | Jaugilas | G05D 1/101 320/109 |
| 2019/0215934 | A1 | 7/2019 | Chen et al. | |
| 2019/0221095 | A1* | 7/2019 | Bonnard | H02B 1/28 |
| 2019/0257828 | A1 | 8/2019 | Sundvor et al. | |
| 2019/0310137 | A1* | 10/2019 | Pop | H04N 7/181 |
| 2019/0361148 | A1* | 11/2019 | Ulmer | G01S 17/95 |
| 2020/0159368 | A1* | 5/2020 | Han | G06F 21/32 |

OTHER PUBLICATIONS

Written Opinion of the International Searching Authority for corresponding International Application No. PCT/US2020/064965, filed Dec. 14, 2020, Written Opinion of the International Searching Authority mailed Apr. 22, 2021 (12 pgs.).

Van Nhan Nguyen, et al. "Automatic autonomous vision-based power line inspection: A review of current status and the potential role of deep learning", International Journal of Electrical Power & Energy Systems, vol. 99, pp. 107-120 (XP085366153), Oxford, GB, Jan. 9, 2018.

Extended European Search Report dated Nov. 7, 2023 issued in corresponding European Patent Application No. 20898689.3 (7 pages).

Canadian Office Action dated Apr. 10, 2024, issued in corresponding Canadian Patent Application No. 3,164,627 (4 pages).

* cited by examiner

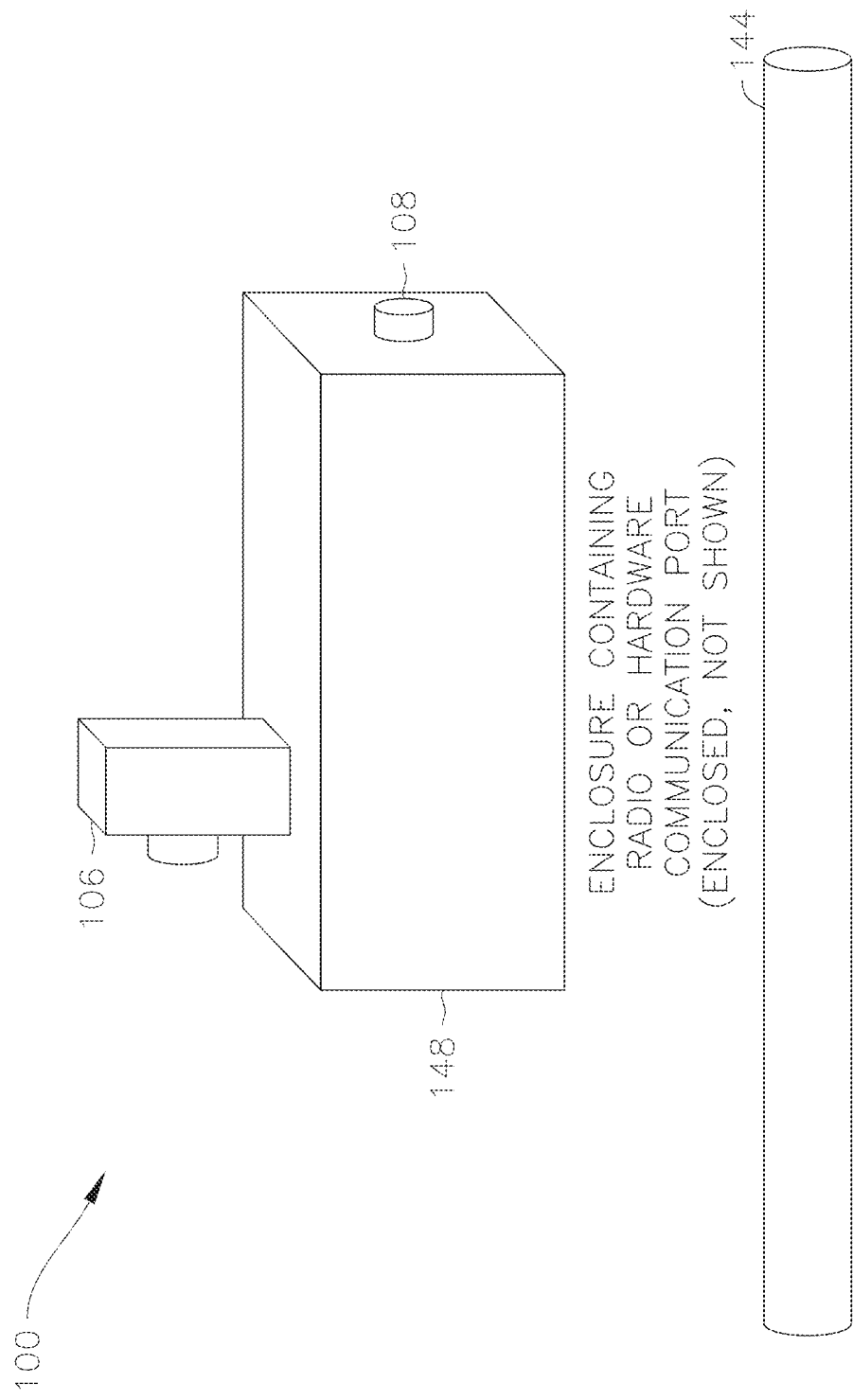

FIG. 11
FIG. 12
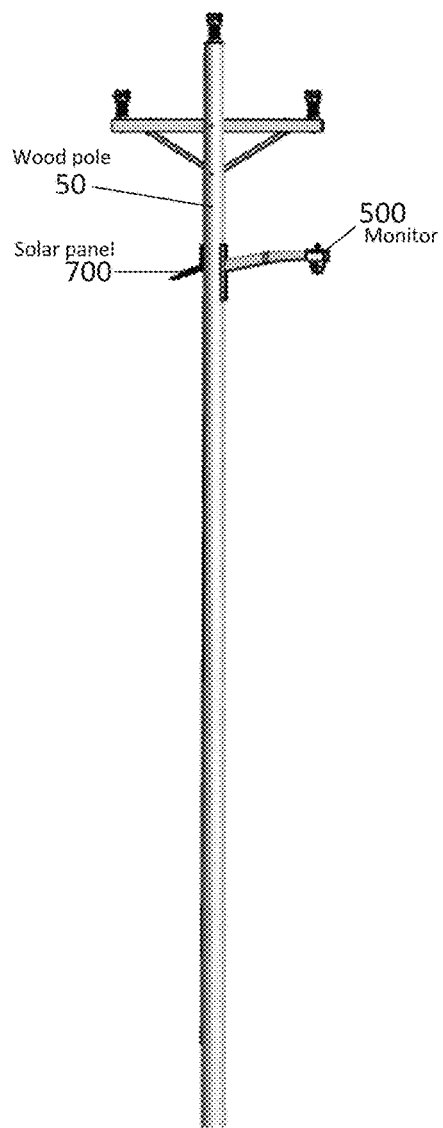
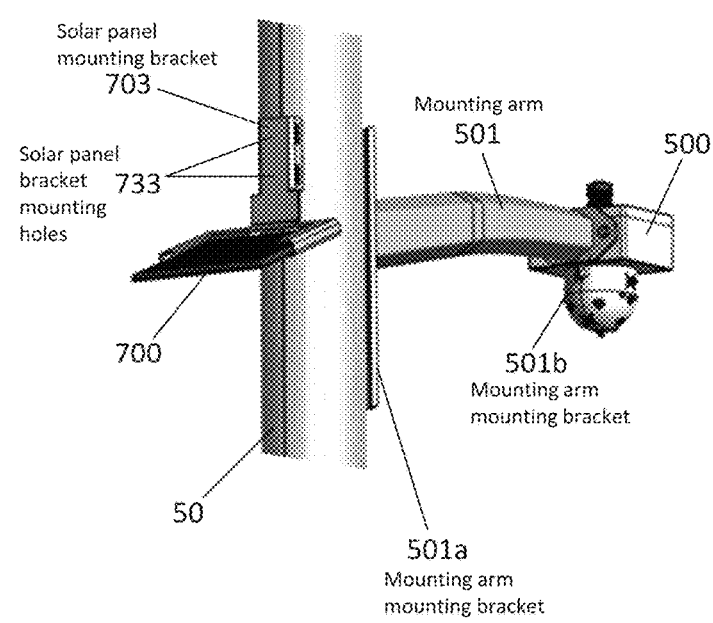

- 801 INSTALLING A FIRE WEATHER CONDITION MONITOR ("MONITOR") ON A MOUNTING STRUCTURE
- 802 INSTALLING AN EXTERNAL POWER SOURCE ON A MOUNTING STRUCTURE IN CLOSE PROXIMITY TO THE MONITOR FOR POWERING THE MONITOR
- 803 POWERING THE MONITOR BY EITHER THE EXTERNAL POWER SOURCE OR A BATTERY OF THE MONITOR
- 804 SENSING AN AMBIENT TEMPERATURE IN THE VICINITY OF THE MONITOR
- 805 SENSING AN AMBIENT HUMIDITY IN THE VICINITY OF THE MONITOR
- 806 SENSING A WIND SPEED AND WIND DIRECTION IN THE VICINITY OF THE MONITOR
- 807 SENSING A MOTION OF A HEAT SOURCE IN THE VICINITY OF THE MONITOR
- 808 TRANSMITTING A SIGNAL TO A MONITORING STATION
- 809 TRANSMITTING A SIGNAL TO ANOTHER MONITOR
- 810 MONITORING INFORMATION TRANSMITTED TO THE MONITORING STATION

SYSTEM AND METHOD FOR DEBRIS DETECTION AND INTEGRITY VALIDATION FOR RIGHT-OF-WAY BASED INFRASTRUCTURE

CROSS-REFERENCE TO RELATED APPLICATIONS

This application claims the benefit of U.S. Provisional Application No. 62/948,071, filed on Dec. 13, 2019, U.S. Provisional Application No. 62/948,078, filed on Dec. 13, 2019, U.S. Provisional Application No. 62/948,081, filed on Dec. 13, 2019, and U.S. Provisional Application No. 63/067,169, filed on Aug. 18, 2020, in the United States Patent and Trademark Office, the entire contents of all of which are incorporated herein by reference.

BACKGROUND

1. Field

Aspects of embodiments of the present invention relate to system and method of debris detection and integrity validation for right-of-way based infrastructure.

2. Description of the Related Art

In recent years, the reliability of services provided by right-of-way (ROW) based infrastructure such as power lines, pipelines, railroad lines, and/or the like has become increasingly difficult to maintain as existing infrastructure ages, expands, and is exposed to a variety of environmental conditions. Generally, to restore an existing service, operators, technicians, engineers, and/or the like may diagnose and resolve problems, and perform safety checks.

However, diagnosing and resolving problems, and performing safety checks may be difficult and time-consuming if information regarding the ROW-based infrastructure relies solely on the perspective of on-site workers. Remote inspection techniques, for example through the use of camera equipped drones, are also time-consuming and suffer from ease of comparison to pre-outage conditions. Further, incomplete information based on the perception of the workers may lead to mistakes or errors that may threaten the health and safety of the workers and/or the public while resulting in further delays of service.

The above information disclosed in this Background section is for enhancement of understanding of the background of the present disclosure, and therefore, it may contain information that does not constitute prior art.

SUMMARY

According to an aspect of one or more embodiments of the present disclosure, systems and methods for debris detection and integrity validation for ROW-based infrastructures are provided.

According to another aspect of one or more embodiments of the present disclosure, an imaging device for capturing "before" and "after" image sets of portions of an object of interest under a variety of conditions is provided.

According to another aspect of one or more embodiments of the present disclosure, systems and methods of reviewing image data sets from one or more imaging devices via a user interface on an electronic device are provided.

According to another aspect of one or more embodiments of the present disclosure, systems and methods for detection of electrical arcs associated with utility electrical equipment are provided.

According to another aspect of one or more embodiments of the present disclosure, systems and methods for fire detection are provided.

According to another aspect of one or more embodiments of the present disclosure, systems and methods for detection of weather conditions are provided.

BRIEF DESCRIPTION OF THE DRAWINGS

The above and other features and aspects will become more apparent to those of ordinary skill in the art by describing in further detail some example embodiments of the present invention with reference to the attached drawings, in which:

FIG. 2B is a perspective view including blocks indicating components of an imaging device according to one or more embodiments of the present disclosure.

FIG. 11 is an illustration of a fire weather condition monitor and an accompanying solar-panel power source mounted to a wooden distribution pole, according to one or more embodiments of the present disclosure.

FIG. 12 is an enlarged view of a region of the fire weather condition monitor and the accompanying solar-panel power source of FIG. 11, according to one or more embodiments of the present disclosure.

FIG. 14 is a flowchart showing a method of dynamic real time fire weather condition monitoring, according to one or more embodiments of the present disclosure.

DETAILED DESCRIPTION

Figure 1A:
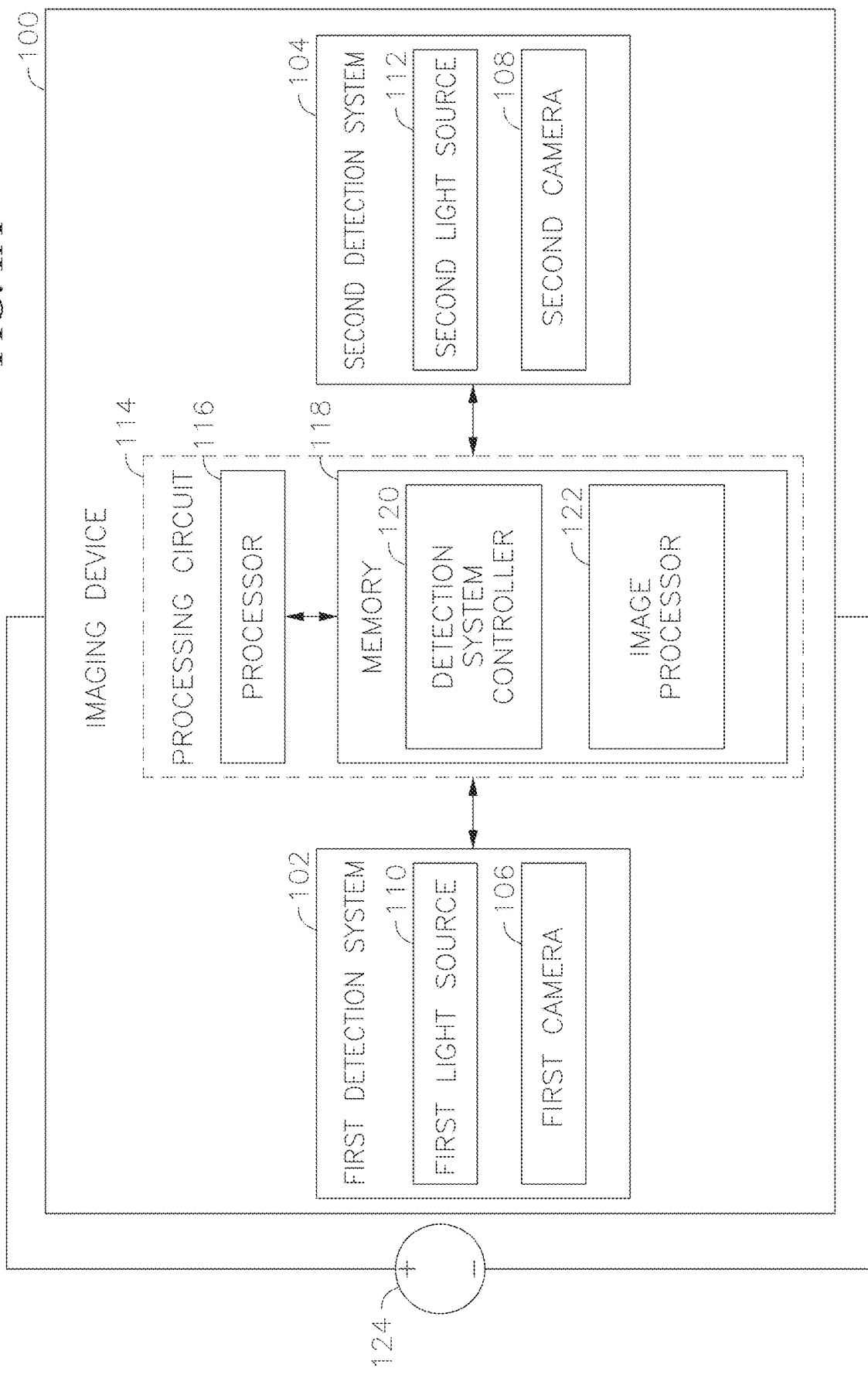
FIG. 1A is a block diagram of an imaging device according to one or more embodiments of the present disclosure.

Herein, some example embodiments will be described in further detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and, thus, descriptions thereof may not be repeated.

In the drawings, relative sizes of elements, layers, and regions may be exaggerated and/or simplified for clarity.

It is to be understood that, although the terms "first," "second," "third," etc., may be used herein to describe various elements, components, regions, layers and/or sections, these elements, components, regions, layers, and/or sections are not limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present disclosure.

It is to be understood that when an element or layer is referred to as being "on," "connected to," or "coupled to" another element or layer, it may be directly on, connected to, or coupled to the other element or layer, or one or more intervening elements or layers may be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It is to be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which the present disclosure belongs. It is to be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Generally, prior to restarting ROW-based infrastructures that have previously been temporarily removed from service, it may be desirable to perform safety checks and confirm that any problems that may cause or have caused failure of the ROW-based infrastructure have been addressed. However, because ROW-based infrastructure are often very lengthy and meandering in nature, operators, technicians, engineers, and/or the like, may not be aware of the status of the entire ROW-based infrastructure and may not be aware of the previous operational condition of the infrastructure which may be helpful for assessing the current condition of the infrastructure. Time consuming physical or drone-based inspections of the entire ROW infrastructure may be required.

According to one or more embodiments of the present disclosure, an imaging device is provided which captures "before" images and/or video sequences for comparison with "after" images and/or video sequences. Based on the comparison, users such as operators, technicians, engineers, and/or the like may be better able to determine, for example, whether to re-energize an electric power line that has been de-energized. For example, in the case of an electric power line, the users may be able to determine that the power line is both intact (e.g., it has not broken and fallen to the ground) and is not fouled by debris (e.g., tree branches) that would cause an electrical fault upon re-energization.

FIG. 1A is a block diagram of an imaging device 100 according to one or more embodiments of the present disclosure.

Referring to FIG. 1A, according to one or more example embodiments, an imaging device 100 includes a first detection system 102 configured to capture images of an environment surrounding the imaging device 100, and a second detection system 104 configured to capture images of an environment surrounding the imaging device 100. As used herein, "images" may refer to images, video sequences, and/or any other suitable format.

Each of the first detection system 102 and the second detection system 104 may be a camera imaging system including one or more cameras 106, 108 coupled to the exterior of or housed with the imaging device 100. The one or more cameras 106, 108 may be configured to capture still and/or video images. The one or more cameras 106 of the first detection system 102 and the one or more cameras 108 of the second detection system 104 may capture overlapping images from the same or different perspectives to create a single, merged image of one or more areas of interest. Third, fourth, or nth detection systems similar to 102 and 104 may be included to match a particular ROW infrastructure.

In one or more embodiments, the one or more areas of interest may include one or more objects of interest such as, for example, portions of a power line and/or components attached to the power line. However, the present disclosure is not limited thereto, and, in other embodiments, areas of interest and associated objects of interest may be areas and objects of other ROW-based infrastructures, such as pipelines, railroad lines, and/or the like.

In one or more embodiments, the first detection system 102 may be facing a first direction, and the second detection system 104 may be facing a second direction opposite to the first direction. Therefore, the first detection system 102 and the second detection system 104 of the imaging device 100 may capture images in, for example, a forward direction and a rearward direction. In this case, the first detection system 102 and the second detection system 104 may capture images of a structure (e.g., a power line, a pipeline, a railroad track, and the like) along a flow direction (e.g., electrical flow, fluid flow, rail transport, and the like). For example the imaging device 100 may be positioned at, on, above, or below a power line such that the first detection system 102 and the second detection system 104 capture images of the power line extending away from opposite ends of the imaging device 100. However, the present disclosure is not limited thereto. For example, in other embodiments, the imaging device 100 may include additional detection systems with one or more cameras set to capture images in any suitable direction desired, such as, for example, a forward direction, a rearward direction, a rightward direction, a leftward direction, a downward direction, an upward direction, and/or the like, such that one or more objects of interest are captured by the imaging device 100 in still and/or video images.

In an embodiment, the first detection system 102 may include a first light source 110 configured to emit light toward a first area of interest (e.g., an area of interest in the first direction) and a first camera 106 configured to detect ambient light (e.g., ambient light including natural light and/or artificial light emitted by, for example, the first light source 110) from the first area of interest. The second detection system 104 may include a second light source 112 configured to emit light toward a second area of interest (e.g., an area in the second direction opposite to the first direction) and a second camera 108 configured to detect ambient light (e.g., ambient light including natural light and/or artificial light emitted by, for example, the second light source 112) from the second area of interest. In one or more embodiments, the first light source 110 and the second light source 112 may be integral with (e.g., housed with) the first camera 106 and the second camera 108, respectively. However, the present disclosure is not limited thereto, and, in other embodiments, the first light source 110 and/or the second light source 112 may be external light sources separate from (e.g., not housed with) the first camera 106 and/or the second camera 108, respectively.

In one or more embodiments, the first light source 110 and the second light source 112 may emit light to facilitate image capture by the first camera 106 and/or the second camera 108, respectively, during low visibility conditions (e.g., nighttime conditions). The first light source 110 and the second light source 112 may emit any suitable wavelength of light for detection by the first camera 106 and the second camera 108, respectively. For example, in one or more embodiments, the first light source 110 and/or the second light source 112 may emit light in the visible wavelength spectrum, and, in other embodiments, the first light source 110 and/or the second light source 112 may emit light in an infrared, ultraviolet, or other non-visible wavelength spectrum. Light in the non-visible wavelength spectrum may be more conducive for detection by the first camera 106 and/or the second camera 108 under certain lighting conditions (e.g., nighttime), physical conditions, weather, and/or expected debris type (e.g., the type of debris that may undesirably affect the integrity of or interfere with operation of the one or more objects of interest).

Although the first light source 110 and the second light source 112 are described with reference to FIG. 1, in one or more embodiments, the first light source 110 and/or the second light source 112 may be omitted. For example, the first light source 110 and/or the second light source 112 may not be included to save power, cost, or to provide a smaller form factor.

In one or more embodiments, the imaging device 100 includes a processing circuit 114 in communication with the first detection system 102 and the second detection system 104. The processing circuit 114 may control the first detection system 102 and the second detection system 104, and may manage storage of video sequences and/or images captured by the first detection system 102 and the second detection system 104.

In one or more embodiments, the processing circuit 114 of the storage device includes a processor 116 and memory 118. The processor 116 may be implemented as a general purpose processor, an application specific integrated circuit (ASIC), one or more field programmable gate arrays (FPGAs), a group of processing components, or any other suitable electronic processing components. The memory 118 (e.g., memory, memory unit, storage device, and/or the like) may include one or more devices (e.g., RAM, ROM, Flash memory, hard disk storage, and/or the like) for storing data and/or computer code for completing or facilitating the various processes described in the present application. The memory 118 may be or include volatile memory or non-volatile memory. The memory 118 may include database components, object code components, script components, or any other type of information structure for supporting the various activities and information structures described in the present application. According to one or more embodiments, the memory 118 may be communicably connected to the processor 116 via the processing circuit 114, and includes computer code for executing (e.g., by the processing circuit 114 and/or the processor 116) one or more processes described herein.

As shown in FIG. 1A, in one or more embodiments, the processing circuit 114 may be implemented within the imaging device 100 as an internal processing circuit of the imaging device 100. However, the present disclosure is not limited thereto. For example, (as indicated by the dotted rectangular block shown in FIG. 1A), the processing circuit 114 or one or more components thereof (e.g., components executing instructions in memory to perform the methods described in the present disclosure) may be distributed across multiple servers or computers that may exist in distributed locations.

In one or more embodiments, the processing circuit 114 may execute instructions in memory 118 to function as a detection system controller 120 and/or an image processor 122. The detection system controller 120 may activate and deactivate the first detection system 102 and/or the second detection system 104 based on set (e.g., predetermined) logic and/or user input via an external signal. The image processor 122 may prepare the images provided by the first detection system 102 and the second detection system 104 for storage and upload to one or more electronic devices 132 (see FIG. 1B) such as, for example, a personal computer, a server, and/or the like.

In one or more embodiments, the detection system controller 120 may be set to activate the one or more cameras of the first detection system 102 and/or the one or more cameras of the second detection system 104 at set times throughout the day to capture images of the first area of interest and/or the second area of interest. The set times throughout the day may be based on the appearance of an object of interest (e.g., a portion of a power line) in the first area of interest and/or the second area of interest under a variety of ambient lighting conditions (e.g., ambient light conditions including natural lighting and/or artificial lighting from a light source).

The images capturing the one or more objects of interest in a desired configuration (e.g., a configuration including an arrangement of the one or more objects of interest operating as desired) may be designated by the image processor 122 as "before" images when storing the storage images in memory 118. For example, images of an operational power line (e.g., an energized power line) may be captured by the imaging device 100 to be used as "before" images. The image processor 122 may store the "before" images with an actual time period and a representative time period. The representative time period may be greater than the actual time period and range from minutes to days depending on the attributes of the object of interest (e.g., the portion of a power line) and the conditions that the object of interest may be subject to, such as lighting conditions (e.g., nighttime), physical conditions, weather, and/or expected debris type (e.g., the type of debris that may affect the integrity of or interfere with operation of the one or more objects of interest).

In one or more embodiments, the detection system controller 120 may deactivate (or turn off) the one or more cameras of the first detection system 102 and the one or more cameras of the second detection system 104 in response to set (e.g., predetermined logic) and/or user input via external signals to avoid capturing "before" images including debris, undesirable conditions, and the like. For example, the one or more cameras of the first detection system 102 and the one or more cameras of the second detection system 104 may be turned off by any suitable mechanism including a communication signal sent to the imaging device 100, a signal from an integral or separate power line current sensor to indicate the line is de-energized, a signal from an integral or separate weather sensor (e.g., a wind speed sensor) that may indicate stormy conditions exist where windborne debris may be present, and/or remote removal of power to the imaging device 100 (e.g., the one or more cameras of the imaging device 100). However, the present disclosure is not limited thereto.

For example, in one or more embodiments, the detection system may not disable the one or more cameras of the first detection system 102 and the one or more cameras of the second detection system 104 in response to adverse conditions (e.g., stormy conditions and the like). In this case, any of the captured images by either detection system may be transmitted to a user for troubleshooting purposes.

If the one or more cameras are deactivated, the detection system controller 120 may activate (or turn on) the one or more cameras of the first detection system 102 and the one or more cameras of the second detection system 104 prior to operating the ROW-based infrastructure. For example, after a power line is de-energized and before a utility re-energizes the power line, the detection system controller 120 may activate the one or more cameras of the first detection system 102 and the one or more cameras of the second detection system 104 to capture new images. The image processor 122 may designate the new images as "after" images when storing the new images in memory 118. In one or more embodiments, the "after" designation may be applied by the image processor 122 in response to user input or being powered on.

In one or more embodiments, the image processor 122 may associate the "before" images with corresponding "after" images based on the actual time period or the representative time period of the "before" images. In other words, the "after" images may be associated with "before" images captured at a similar time of day and/or under similar conditions. The image processor 122 may transmit "before" images with the associated "after" images to a user (e.g., an operator) or a server for later retrieval and longer term storage as described in further detail with reference to FIG. 1B. Accordingly, the user (e.g., the operator) may compare the "before" and "after" images to determine if the comparison indicates a sufficient difference in appearance that would suggest that the integrity of one or more objects of interest has been violated. For example, the integrity of a power line may be violated when, for example, a conductor is broken or fouling debris may be present (e.g., tree branches lying across one or more conductors of the power line).

Although the image processor 122 of the imaging device 100 is described as associating the "before" and "after" images, the present disclosure is not limited thereto. For example, the association may be done manually by a user based on time, date, location data, and the like, or may be performed by the server and/or one or more electronic devices 132 receiving the "before" and "after" images from the imaging device 100.

In one or more embodiments, the imaging device 100 and components thereof may be supplied with power from any suitable power source 124. For example, an external alternating current (AC) or direct current (DC) power source, solar panels, a magnetic field harvesting power supply, and/or the like, and may contain a battery or other source such as a fuel cell to ensure operation for a period of time in the event the power source 124 ceases to function. For example, the battery may provide power at night in conjunction with a solar panel-based power source 124.

Figure 1B:
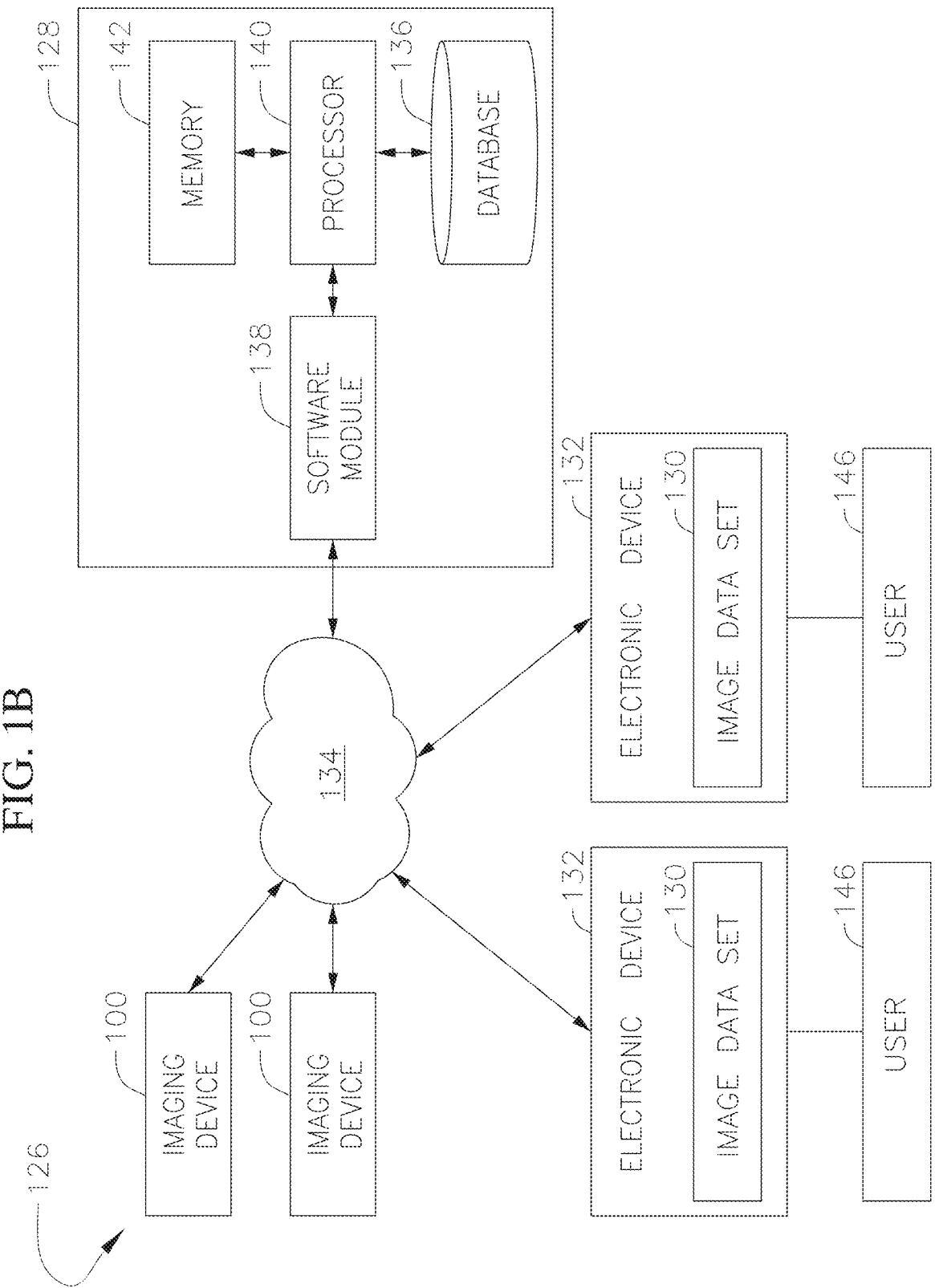
FIG. 1B is a block diagram of an electronic communication system including one or more imaging devices according to one or more embodiments of the present disclosure.

FIG. 1B is a block diagram of an electronic communication system 126 including one or more imaging devices 100 according to one or more embodiments of the present disclosure.

Referring to FIG. 1B, the one or more imaging devices 100 may be part of an electronic communication system 126 for processing, communicating, and/or reviewing (e.g., annotating) an image data set 130 including images from the one or more imaging devices 100 according to one or more embodiments of the present disclosure. In an embodiment, the electronic communication system 126 may include a server 128, one or more electronic devices 132 operated by one or more corresponding users 146, and one or more imaging devices 100.

The one or more users 146 may be, for example, operators, technicians, engineers, and/or the like. The one or more users 146 may operate the one or more electronic devices 132 to view images from the one or more imaging devices 100. Depending on the privileges of the one or more users 146, the users 146 may annotate the image data set 130 including images from the one or more imaging devices 100. For example, the one or more users 146 may provide custom notes associated with any of the images, an indication of whether any of the images has been reviewed, and/or an indication of whether any of the images indicates conditions in which an in-person or other suitable inspection (field check) is desired or required to validate whether the ROW infrastructure location requires repair, replacement, restoration, clearing, etc., as annotated by a user 146. Although two electronic devices 132, two imaging devices 100, and one server 128 are shown in FIG. 1B, the present disclosure is not limited thereto. For example, any suitable number of electronic devices 132, imaging devices 100, and/or servers 128 may be communicably connected with each other via the electronic communication system 126.

In one or more embodiments, the server 128 may be connected to (i.e. in electronic communication with) the one or more electronic devices 132 and the one or more imaging devices 100 over a data network 134, such as, for example, a local area network or a wide area network (e.g., a public Internet). The server 128 may include a software module 138 for coordinating electronic communications between the users 146, one or more imaging devices 100, and a database 136 of the server to provide the functions described throughout the application.

In one or more embodiments, the server 128 may include a mass storage device or database 136, such as, for example, a disk drive, drive array, flash memory, magnetic tape, or other suitable mass storage device for storing information used by the server 128. For example, the database 136 may store images, attributes of the images including location data, time, date, designation (e.g., "before," "after," or no designation), annotations, and the like. The database 136 may also store imaging device settings, such as camera settings and/or an identification or group associated with one or more imaging devices 100, and the like. The database 136 may also store data associated with any of the image or device attributes, but collected from other sources. For example, the database 136 may store wind speed, wind direction, or other weather data associated with the location of a imaging device 100 as collected from other sensors or third party services at the time an image was captured. Although the database 136 is included in the server 128 as illustrated in FIG. 1B, the present disclosure is not limited thereto. For example, the server 128 may be connected to an external database that is not a part of the server 128, in which case, the database 136 may be used in addition to the external database or may be omitted entirely.

The server 128 may include a processor 140 which executes program instructions from memory 142 to perform the functions of the software module 138. The processor 140 may be implemented as a general purpose processor 140, an application specific integrated circuit (ASIC), one or more field programmable gate arrays (FPGAs), a group of processing components, or other suitable electronic processing components. The memory 142 (e.g., memory, memory unit, storage device, and/or the like) may include one or more devices (e.g., RAM, ROM, Flash memory, hard disk storage, and/or the like) for storing data and/or computer code for completing or facilitating the various processes described for the software module 138. The memory 142 may be or include volatile memory or non-volatile memory. The memory 142 may include database components, object code components, script components, or any other type of information structure for supporting the various activities and information structures described for the software module 138. According to one or more embodiments, the memory 142 may be communicably connected to the processor 140 via the server 128, and may include computer code for executing one or more processes described for the software module 138.

In one or more embodiments, the one or more electronic devices 132 and the one or more imaging devices 100 may be connected to the electronic communication system 126 via a telephone connection, satellite connection, cable connection, radio frequency communication, mesh network, or any other suitable wired or wireless data communication mechanism. In one or more embodiments, the electronic devices 132 may take the form of, for example, a personal computer (PC), hand-held personal computer (HPC), personal digital assistant (PDA), tablet or touch screen computer system, telephone, cellular telephone, smartphone, or any other suitable electronic device.

In one or more embodiments, the image data set 130 may be transmitted to the one or more electronic devices 132 and/or the server 128 upon receipt, by one or more imaging devices 100, of the command or trigger to stop capturing or designating "before" images of the image data set 130. By preemptively transmitting a portion of the image data set 130 (e.g., the "before" images), an image data set 130 including the "before" and "after" images may be more quickly available for review by a user 146 because the one or more imaging devices 100 may only need to transmit the "after" images in response to capturing the "after" images. Accordingly, the one or more imaging devices 100 may transmit the "before" and "after" images of the image data set 130 separately. However, the present disclosure is not limited thereto, and, in other embodiments, the "before" images of the image data set 130 may be sent concurrently with the command or trigger to send "after" images of the image data set 130.

In one or more embodiments, one or more imaging devices 100 may be grouped together as desired. For example, one or more imaging devices 100 viewing or installed on the same power line may be part of a group. The detection system controller 120 of each of the one or more imaging devices 100 of the group may receive a stop command or be triggered to stop capturing or designating "before" and/or "after" images. Upon receipt of the stop command sent to the group or trigger applied to the group, an image data set 130 from each of the one or more imaging devices 100 in the group may be transmitted to the one or more electronic devices 132 and/or server 128. By stopping one group at a time, the user 146 may review the image data sets 130 of one group at a time instead of waiting to receive and review image data sets 130 associated with imaging devices 100 of multiple groups. In other words, by grouping one or more imaging devices 100 according to a set scheme (e.g., by power line), the review process may be sped up because the user 146 may review, for example, one power line at a time instead of waiting for data from imaging devices of multiple groups corresponding to multiple power lines at once.

Figure 2A:
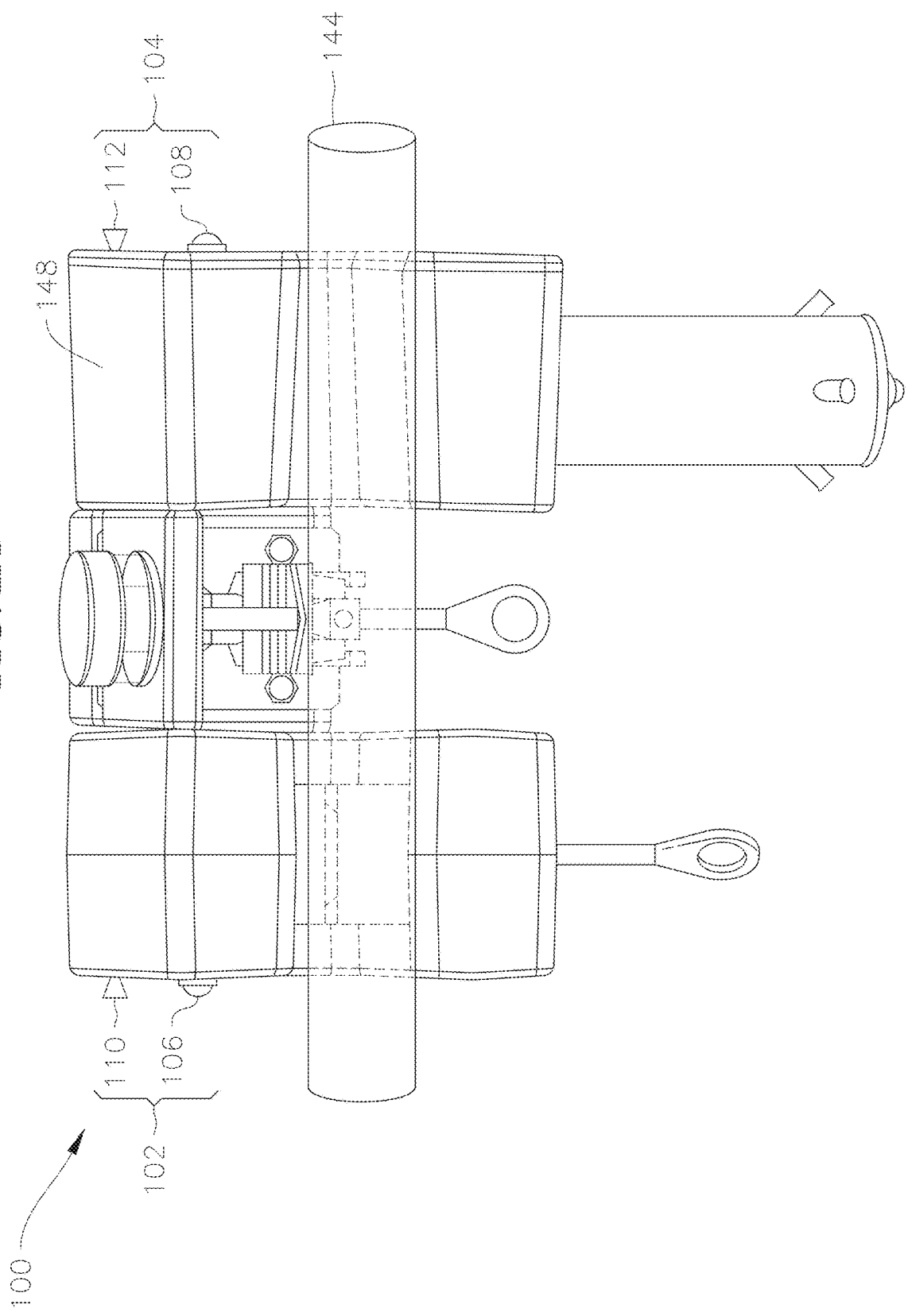
FIG. 2A is a perspective view of an imaging device according to one or more embodiments of the present disclosure.

FIG. 2A is a perspective view of an imaging device 100 according to one or more embodiments of the present disclosure.

Referring to FIG. 2A, an imaging device 100 according to one or more embodiments of the present disclosure may include a first detection system 102 and a second detection system 104. The first detection system 102 may include a first camera 106 and a first light source 110, and the second detection system 104 may include a second camera 108 and a second light source 112. In an embodiment, the first camera 106, the first light source 110, the second camera 108, and the second light source 112 may be integral with (e.g., housed with) each other.

As shown in FIG. 2A, in one or more embodiments, the imaging device 100 may include a housing 148 which is mountable on (e.g., directly mountable on) a conductor 144, or power line, such that the first camera 106 and the second camera 108 capture images of the conductor 144 at opposite sides of the imaging device 100. As such, the imaging device 100 may capture "before" and "after" images of the conductor 144. The "before" and "after" images may be transmitted to the electronic device 132 and/or the server 128 through the data network 134 for review and storage, respectively. In one or more embodiments, the housing 148 of the imaging device 100 may accommodate radio or hardware communication circuitry, an integral or external magnetic field harvesting power supply, a solar panel power supply, and/or a battery.

FIG. 2B is a perspective view including blocks indicating components of an imaging device 100 according to one or more embodiments of the present disclosure.

Referring to FIG. 2B, an imaging device 100 according to one or more embodiments of the present disclosure may include a first detection system including a first camera 106 and a second detection system including a second camera 108. The first camera 106 may not be integral with (e.g., may not share a housing with) other components of the imaging device 100. For example, the first camera 106 may be mounted on a surface of a housing 148 enclosing radio or hardware communication circuitry, a solar panel power supply, and/or a battery. In one or more embodiments, the second camera 108 may be integral with (e.g., may share a housing with) the imaging device 100. However, the present disclosure is not limited thereto, and any cameras and/or light sources may be integral with (e.g., housed with) or separate from (e.g., spaced apart from or mounted on a surface of) other components of the imaging device 100.

In one or more embodiments, the first camera 106 and the second camera 108 may be oriented such that the first camera 106 and the second camera 108 capture images of the conductor 144 from opposite sides of the imaging device 100, or at fixed angles with respect to each other, or installed on a locally or remotely adjustable mounting, to better capture images of the conductor 144 at a location (e.g., a location where a power line makes a change in angle to follow its easement). As such, the imaging device 100 may capture "before" and "after" images including portions of the conductor 144. The "before" and "after" images may be transmitted to an electronic device and/or a server for review and storage, respectively.

Although a conductor 144 of a power line is captured by the imaging device 100 in FIGS. 2A and 2B, the present disclosure is not limited thereto. For example, in other embodiments, the imaging device 100 may be used with other ROW-based infrastructures, such as pipelines, railroad lines, and/or the like in a similar manner.

Figure 3:
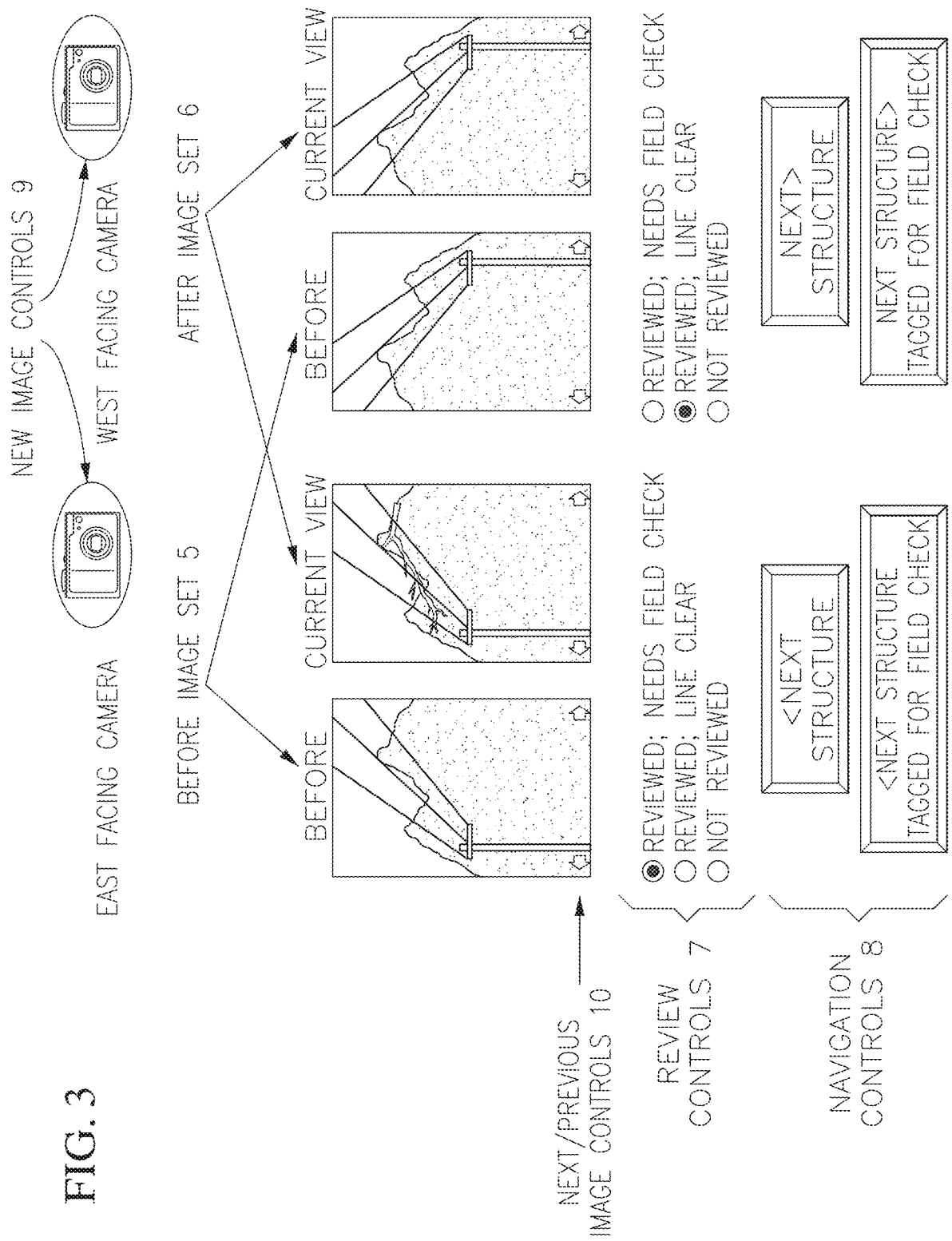
FIG. 3 is a view of a user interface provided to an electronic device available to a user according to one or more embodiments of the present disclosure.

FIG. 3 is a view of a user interface provided to an electronic device 132 available to a user according to one or more embodiments of the present disclosure.

In one or more embodiments, a user 146 may manually view image data sets 130 (see, e.g., FIG. 1B) including images from one or more imaging devices 100 via a user interface. Each image data set 130 may include a "before" image set and an "after" image set based on the designation of "before" or "after" set by the imaging device 100 (e.g., the image processor) capturing the images stored in the image data set. In one or more embodiments, the user interface may be a computer- or internet-based user interface that simplifies the visual comparison of the "before" and "after" image sets.

As shown in FIG. 3, a "before" image set 5 and an "after" image set 6 may be viewed side-by-side for ease of comparison. Controls 10 may allow the user 146 to view images taken previously or later in time from the currently viewed "before" image set 5 and the "after" image set 6. In one or more embodiments, controls 9 may allow the user 146 to capture and transmit new images from the imaging device 100 to be displayed as new "after" images adjacent to the currently viewed "before" image set 5 as desired. In other words, the user 146 may manually operate the first detection system 102 and/or the second detection remotely to capture and transmit new images (e.g., "after" images).

In one or more embodiments, a set of review controls 7 may allow the user 146 to indicate the results of the review (e.g., "reviewed; needs field check," "reviewed; line clear," or "not reviewed," as shown in FIG. 3). In one or more embodiments, navigation controls 8 may allow the user 146 to easily move to other image data sets 130 from another imaging device 100 installed on the next location of the power line (e.g., the same or a different conductor), and/or to the next device 100, which has already been tagged as "needs field check," and/or a different power line as desired.

Accordingly, as disclosed herein, one or more embodiments of the present disclosure provide an imaging device 100 which captures "before" images for comparison with "after" images. Based on the comparison, users 146, such as operators, technicians, engineers, and/or the like, may be better able to determine, for example, whether to re-energize a power line that has been de-energized.

Figure 4:
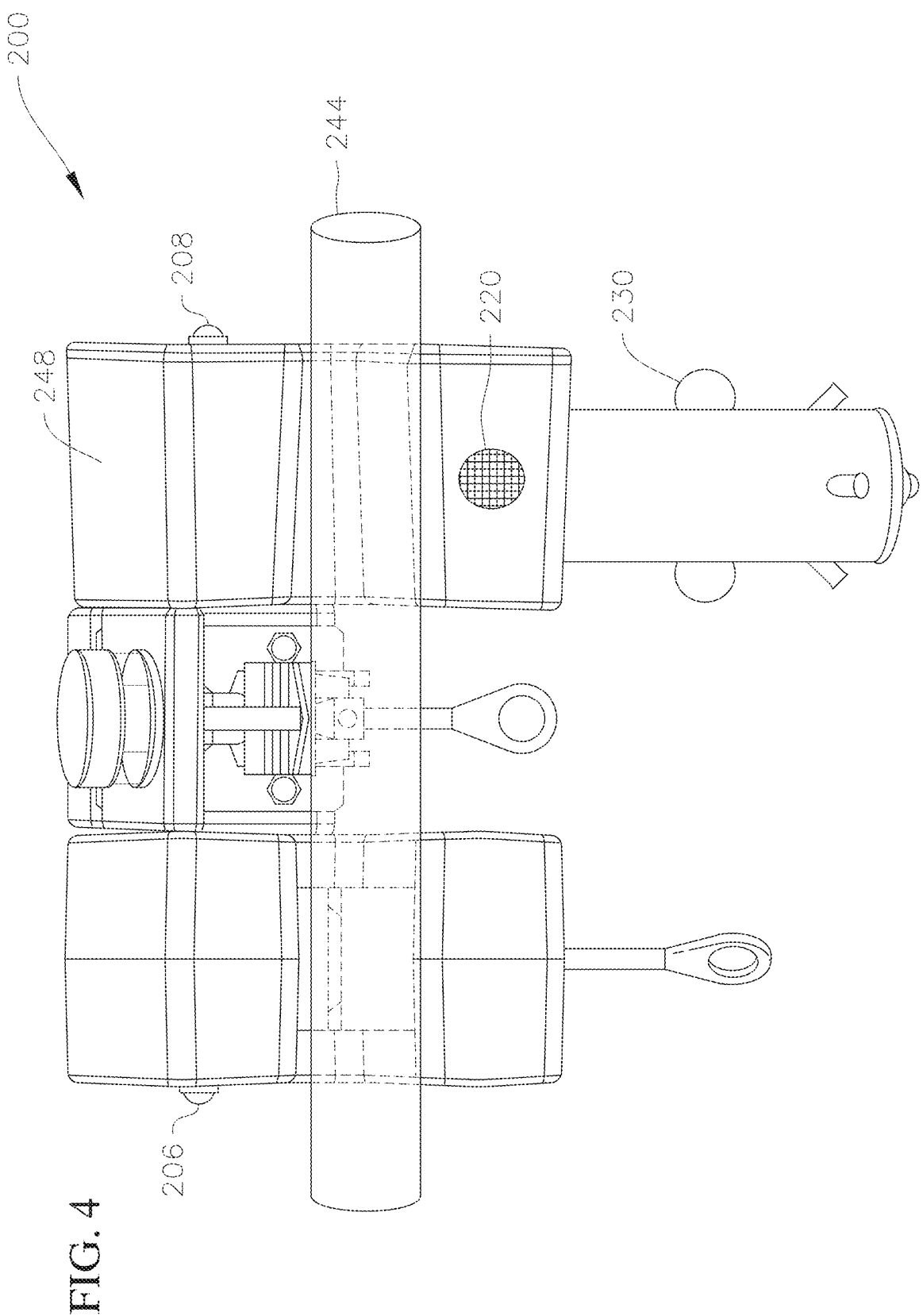
FIG. 4 is a perspective view of a device for detection of electrical arcs according to one or more embodiments of the present disclosure.

FIG. 4 is a perspective view of a device 200 for detection of electrical arcs according to one or more embodiments of the present disclosure.

Wildfires may be caused by electrical arcs associated with utility electrical equipment. This is often the result of wind-related conductor movement whereby conductors either come in contact with each other, or the movement reduces the electrical clearance between them, or the presence of an animal which reduces the electrical clearance, or between a conductor and its metallic support structure whereby an electrical arc jumps between the conductors or the conductor and the structure, or by an electrical equipment failure. The resulting arc can be blown by the wind and come in contact with a flammable material (e.g., brush, trees, grass, etc.) thereby starting a wildfire. Detection of external environmental phenomena associated with electrical arcs can be used to alert electric utility or fire-fighting personnel of a possible fire. Such detection can also be used to place other wildfire detection sensing equipment into higher alert states (e.g., more frequent sensing cycles or lowered sensing thresholds).

In an embodiment, the device 200 for detection of electrical arcs may include a combination of one or more cameras 206, 208, an RF detector included at a housing 248, one or more microphones 230, and an ozone detector 220. The device 200 may be mounted on a utility power line 244, or installed on a stand-alone structure or support. The various sensor outputs are configured to continuously monitor for the optical signatures associated with electrical arc flashes, the slow front RF waves associated with power frequency arcs, the audio signatures associated with the crackle and buzzing associated with arcs, and an increase in the level of detected ozone, a byproduct of arcs. In an embodiment, the one or more cameras 206, 208, the RF detector, the one or more microphones 230, and the ozone detector 220 may be integral with (e.g., housed with) each other.

In an embodiment, algorithms in an onboard microprocessor provide processing for the suitable arc-related interpretation of each sensor output. Detection of two or more arc-related phenomena will result in the declaration of a possible arc event. This declaration may result in the device 200 to communicate the condition to personnel or entities interested in this condition, including, but not limited to, electric utility and wildfire command center personnel or systems. The declaration may also cause other systems in the device 200 to change an operating state. For example, one or more of the cameras 206, 208 may be triggered to capture images or video and store or transmit the same to interested personnel or systems. Also, in an embodiment, the device 200 may include heat detectors which may be set to poll at a higher frequency in order to detect heat from a fire.

As shown in FIG. 4, in one or more embodiments, the device 200 for detection of electrical arcs may include the housing 248 which is mountable on (e.g., directly mountable on) a conductor 244, or power line. The output from the one or more cameras and sensors may be transmitted to an electronic device and/or a server through a data network for review and storage, respectively. In one or more embodiments, the housing 248 of the device 200 for detection of electrical arcs may accommodate radio or hardware communication circuitry, an integral or external magnetic field harvesting power supply, a solar panel power supply, and/or a battery.

In one or more embodiments, the device 200 for detection of electrical arcs may include a processing circuit that is the same or similar to the processing circuit 114 described above with respect to the imaging device 100. Further, in one or more embodiments, one or more of the device 200 for detection of electrical arcs may be part of an electronic communication system that is the same or similar to the electronic communication system 126 described above with respect to the imaging device 100. Therefore, further description of the processing circuit and the electronic communication system associated with the device 200 for detection of electrical arcs will not be provided.

Figure 5:
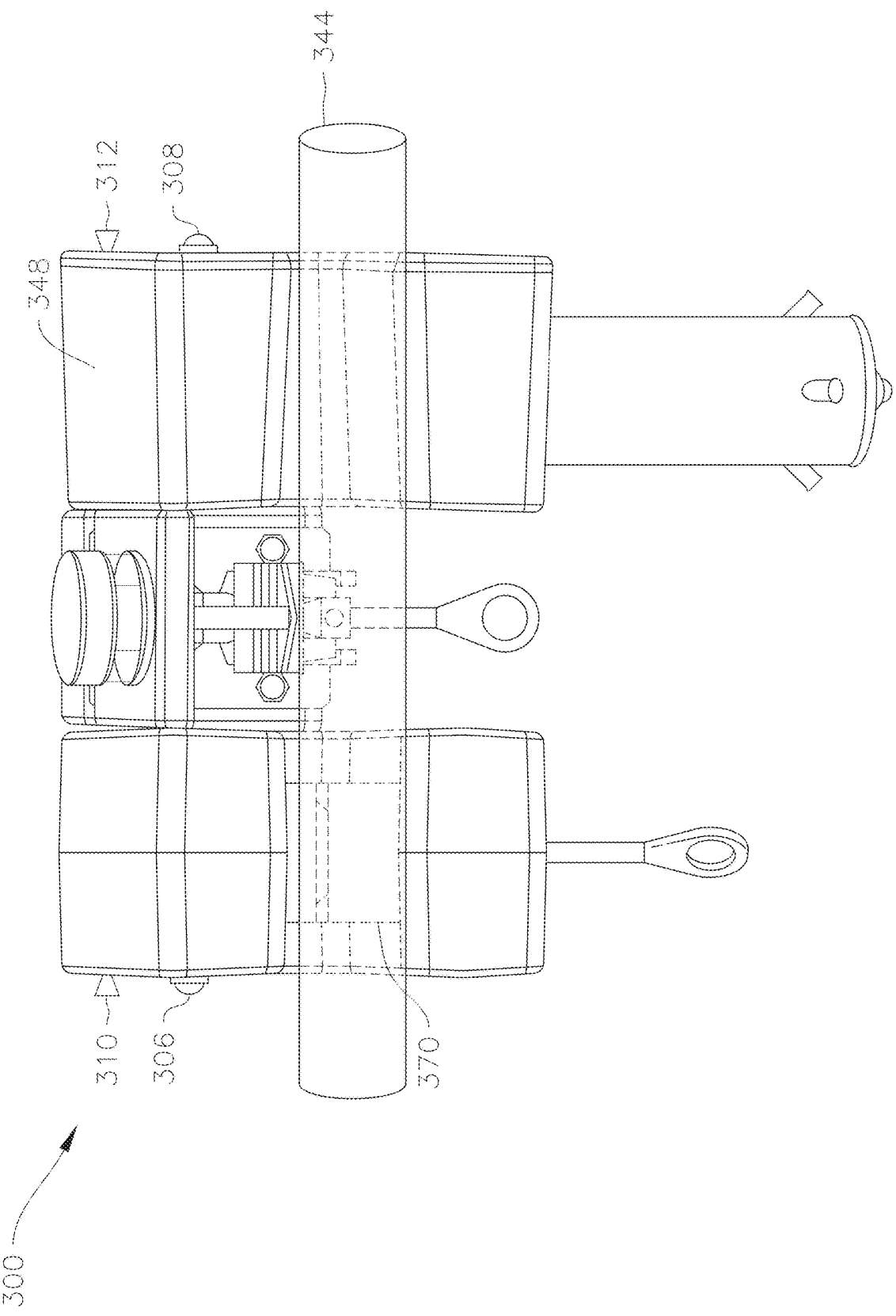
FIG. 5 is a perspective view of a device for fire detection according to one or more embodiments of the present disclosure.

FIG. 5 is a perspective view of a device 300 for fire detection according to one or more embodiments of the present disclosure.

The device 300 for fire detection may be similar to the device 200 for detection of electrical arcs and may include similar components. In an embodiment, the device 300 for fire detection may include one or more cameras 306, 308, one or more infrared (IR) sensors 310, 312, and an external magnetic field harvesting power supply 370, such as to obtain power from a conductor 344, or power line, on which the device 300 for fire detection is mounted. In an example embodiment, the IR sensors may be of a 32×32 array type, and the cameras may be of an 8-megapixel type, but embodiments of the present invention are not limited thereto. In an embodiment, the device 300 for fire detection may also include one or more thermal sensors (e.g., thermopiles). In an embodiment, the one or more cameras, sensor, and other components may be integral with (e.g., housed with) each other.

As shown in FIG. 5, in one or more embodiments, the device 300 for fire detection may include a housing 348 which is mountable on (e.g., directly mountable on) a conductor 344, or power line. The outputs from the one or more cameras, one or more IR sensors, and other sensors may be transmitted to an electronic device and/or a server through a data network for review and storage, respectively. In one or more embodiments, the housing 348 of the device 300 for fire detection may accommodate radio or hardware communication circuitry, an integral or external magnetic field harvesting power supply, a solar panel power supply, and/or a battery.

In one or more embodiments, the device 300 for fire detection may include a processing circuit that is the same or similar to the processing circuit 114 described above with respect to the imaging device 100. In one embodiment, the device 300 for fire detection may include a first microprocessor to receive and process data from the one or more cameras, and a second microprocessor to receive and process data from the one or more IR sensors. Further, in an embodiment, the first microprocessor may obtain and process data from the thermal sensors and may require a lower amount of power than the second microprocessor. In an embodiment, the first microprocessor may be powered by the battery, such as at night. In an embodiment, the second microprocessor may be turned on so as to take and process images when a certain condition is detected by the first microprocessor. Further, in one or more embodiments, one or more of the device 300 for fire detection may be part of an electronic communication system that is the same or similar to the electronic communication system 126 described above with respect to the imaging device 100. Therefore, further description of the processing circuit and the electronic communication system associated with the device 300 for fire detection will not be provided.

Figure 6:
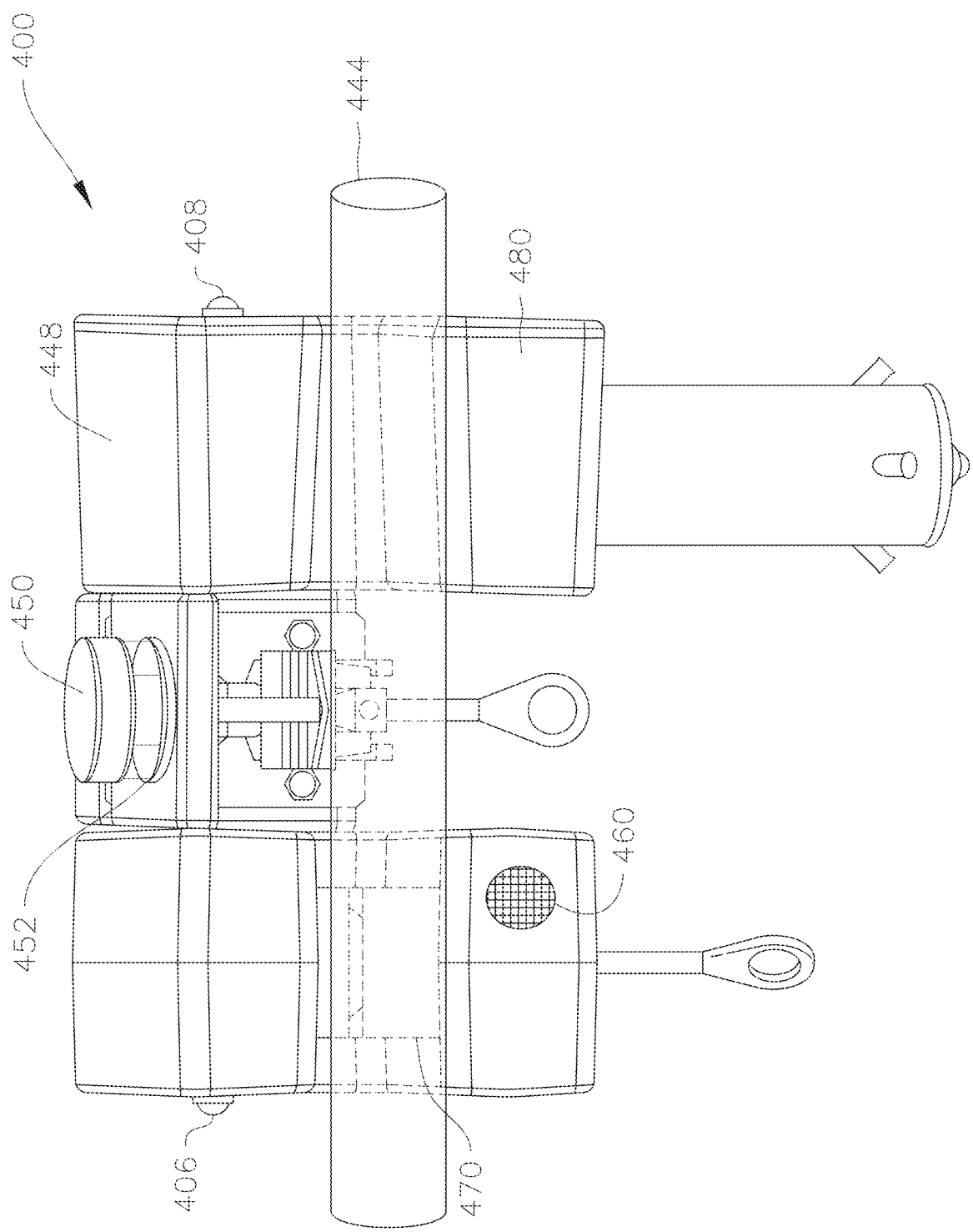
FIG. 6 is a perspective view of a device for detection of weather conditions according to one or more embodiments of the present disclosure.

FIG. 6 is a perspective view of a device 400 for detection of weather conditions according to one or more embodiments of the present disclosure.

Fire-fighting and monitoring agencies depend upon a combination of weather monitoring services that depend on airport-based weather stations, and miscellaneous local weather stations to determine the prevailing weather conditions during an active wildfire.

Red flag wildfire warnings are declared when a combination of high winds and low humidity exists, during which, if a fire ignites, it can quickly turn into a devastating wildfire. Such conditions lead to quick spreading of the wildfire if not extinguished promptly while it may be still small in areas.

It is well documented that during an active fire, the heat of the fire itself produces its own, highly local, weather conditions, most importantly wind. The result of the relatively broad area weather data provided by existing services is that such weather data is a poor predictor of fire behavior as the highly local weather conditions produced by the fire itself are not known.

Monitoring critical weather conditions, such as local wind speed, wind direction, humidity, and temperature, enables the prediction of potential fires under red flag warning periods. Such measurements can assist firefighting agencies in determining how best to attack the fire after it has erupted, and in planning of any evacuations for protection of life. While firefighters are engaged in fighting the fire, such data can also assist firefighters to plan for their own safety while in action.

Under red flag warnings, electric utilities often preemptively turn off power to reduce the likelihood that wind-related impacts to the power system do not inadvertently act as a source of wild fire ignition. After the red flag warnings have passed, determination of whether power may be restored is often made on the relatively large scale weather data gathered by the aforementioned prevailing weather data sources. This often delays restoration to customers where local weather conditions are not reflective of the larger scale reported conditions.

As overhead electrical power lines are ubiquitous in both rural and urban environments, embodiments of the present invention will provide detection of local wind speed, direction, and temperature along power lines and can provide much more precise and detailed weather information to firefighting agencies regarding possible fire-prone areas, weather conditions in active fires, and for electric utilities to better determine which geographic areas experience power outages and when power restoration can occur.

In an embodiment, the device 400 for detection of weather conditions may be mounted on a power line 444 and may include an anemometer 452 of any suitable technology, including, but not limited to, any of ultrasonic and flow through pressure differential sensors for wind speed and wind direction, an ambient temperature sensor 450, and an ambient humidity sensor 460 to take periodic measurements and communication of the data to electric utility and for warning and updating of worsening weather conditions. In an embodiment, the device 400 for detection of weather conditions is different from other stand-alone weather stations in that it is powered from the current flowing through the power line 444 by a magnetic field harvesting power supply 470 which also charges a battery 480. The battery 480 may provide power to the device 400 for detection of weather conditions during such time that the power to the power line 444 is off, such as during red flag warning conditions. In an embodiment, the various sensors, the magnetic field harvesting power supply, and the battery may be integral with (e.g., housed with) each other.

In an embodiment, a microprocessor included within the device 400 for detection of weather conditions conducts data fusion and keeps track of changing weather conditions. In the presence of the fire around the area, measurements may be taken at higher rates to monitor the intensified weather generated by the fire itself. This may help firefighters maneuver in a fire zone without getting trapped therein with harmful outcomes. In an embodiment, weather data is continuously compared for tracking changes in conditions.

The device may send warning signals and data to a wildfire command center preemptively based on data fusion algorithms, or by request. In an embodiment, communications may be made via satellite and cellular communication channels available on board.

As shown in FIG. 6, in one or more embodiments, the device 400 for detection of weather conditions may include a housing 448 which is mountable on (e.g., directly mountable on) a conductor 444, or power line. The sensed information may be transmitted to an electronic device and/or a server through a data network for review and storage, respectively. In one or more embodiments, the housing 448 of the device 400 for detection of weather conditions may accommodate radio or hardware communication circuitry, an integral or external magnetic field harvesting power supply, a solar panel power supply, and/or a battery.

In one or more embodiments, the device 400 for detection of weather conditions may include a processing circuit that is the same or similar to the processing circuit 114 described above with respect to the imaging device 100. Further, in one or more embodiments, one or more of the device 400 for detection of weather conditions may be part of an electronic communication system that is the same or similar to the electronic communication system 126 described above with respect to the imaging device 100. Therefore, further description of the processing circuit and the electronic communication system associated with the device 400 for detection of weather conditions will not be provided.

Figure 7:
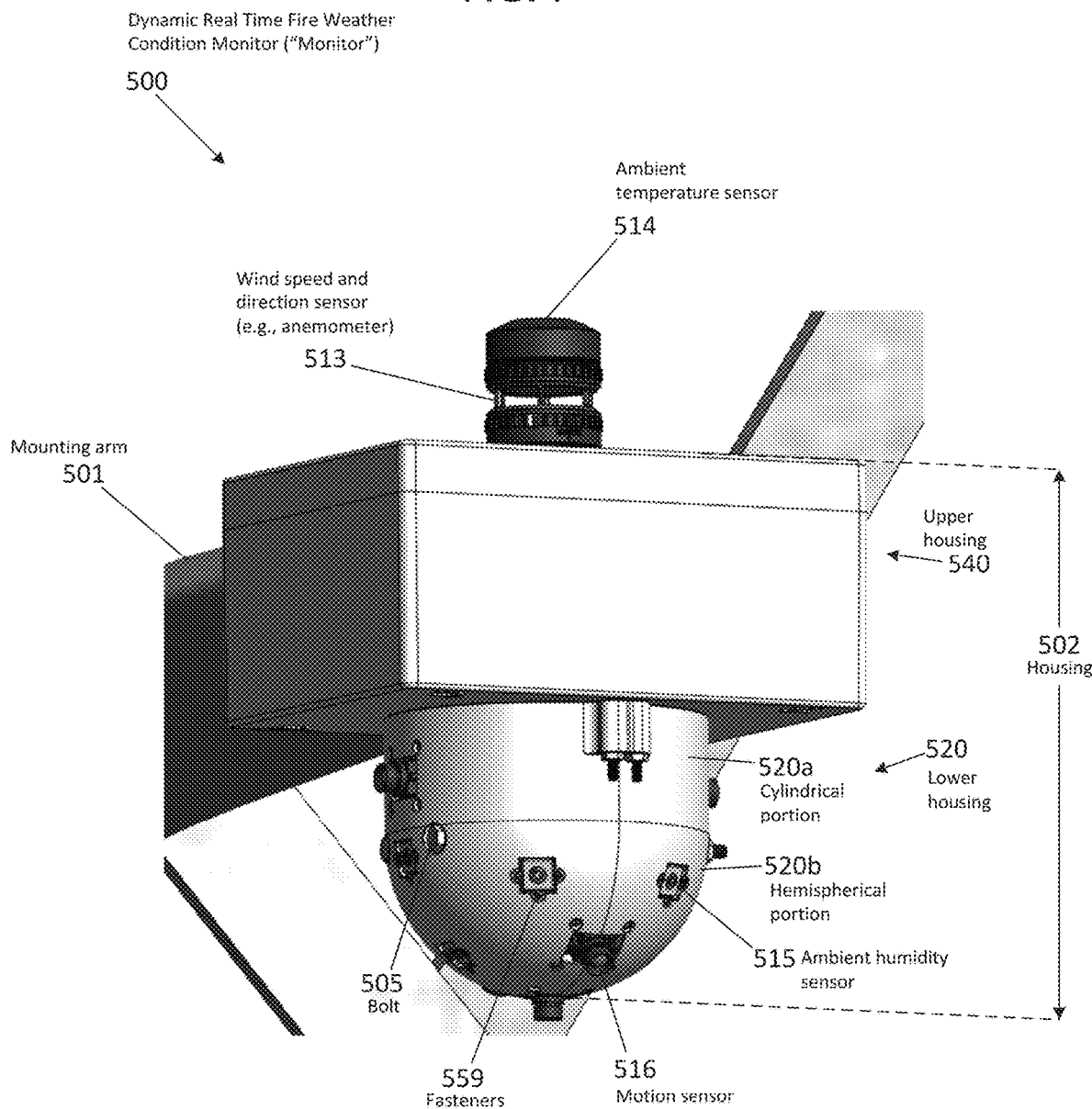
FIG. 7 shows a fire weather condition monitor with sensors, according to one or more embodiments of the present disclosure.

Referring to FIG. 7, a dynamic real time fire weather condition monitor ("monitor") 500 according to an embodiment of the present invention includes a housing 502 having an upper housing 540 and a lower housing 520. The monitor 500 may be mounted to other structures by way of a mounting member (e.g., a mounting arm or mounting brackets) 501. The monitor 500 may be mounted such that the lower housing 520 is positioned closer to a surface of the ground beneath the monitor 500 than the upper housing 540. The monitor 500 includes one or more sensors configured to sense in real time at least one of a wind speed, a wind direction, a temperature, a humidity, a position, and a motion. The sensors may be configured to take periodic measurements and communicate the data to a processor.

For example, the monitor 500 is shown with four types of external sensors mounted to the housing 502. First, a wind speed and direction sensor (e.g., an anemometer) 513 configured to measure a wind speed and direction in the vicinity of the monitor 500 may be mounted to the upper housing 540. The wind speed and direction sensor 513 may be of any suitable type (e.g., an ultrasonic sensor or a flow through pressure differential sensor). An ambient temperature sensor 514 may be mounted to the upper housing 540. A temperature sensor 514 configured to measure an ambient temperature in the vicinity of the monitor 500 may be mounted to the upper housing 540. The temperature sensor may include an infrared (IR) temperature sensor and/or a thermometer. An ambient humidity sensor 515 configured to measure a humidity in the vicinity of the monitor 500 may be mounted to the lower housing 520. The ambient humidity sensor 515 may be of any suitable type (e.g., capacitive, resistive, or thermal conductivity). A motion sensor 516 configured to detect motion of a heat source below the monitor 500 may be mounted to the lower housing 520. However, in some embodiments, one or more of the above-described sensors may not be present in the monitor 500. Further, the present invention is not limited to the above-described sensors, and, in other embodiments, the monitor 500 may include any other suitable sensors or devices configured to sense, measure, or detect a property of the environment or the monitor 500.

The housing 502 includes an upper housing 540 and a lower housing 520. In an embodiment, the upper housing 540 may be substantially rectangular, while the lower housing 520 may have a cylindrical portion 520a and a hemispherical portion 520b. The cylindrical portion 520a may provide a more ideal mounting surface for sensors positioned to take measurements at different angles around a level of height of the monitor 500. The hemispherical portion 520b may provide a more ideal mounting surface for sensors positioned to take measurements at different angles toward a surface of the ground below the monitor 500. The housing may be made of a suitable material that can survive harsh wildfire weather conditions (e.g., heat and smoke) and harsh non-wildfire weather conditions (e.g., rain and snow).

Referring to FIGS. 8 to 13, in one or more embodiments, internal to the monitor 500 are a transmitter (or transceiver) 615, a global navigation satellite system (GNSS) sensor 617, a processor 619, a power source 726, and a battery 727. The transceiver 615 is configured to send and receive messages (e.g., alerts) with, for example, other such monitors (e.g., 500a or 500x) and/or a monitoring station (e.g., a wildfire command center) 720, as described below (see FIG. 13). The monitor 500 may send warning signals and data to intended recipients preemptively, based on data fusion algorithms, or by request. Communications may be via satellite and cellular communication channels available on board. The GNSS sensor (e.g., a Global Positioning System (GPS) sensor) 517 is configured to detect the location of the monitor 500. The processor 619 is configured to control and interpret the sensor readings, send alerts to suitable receivers using the transceiver 615, and relay alerts from the processors of other monitors. For example, the processor 619 may continuously compare weather data, conduct data fusion, and keep track of changing weather conditions. Further, the processor 619 may control a frequency at which measurements are taken by the sensors. For example, the processor 619 may interpret data to detect when a wildfire 15 may be in the vicinity of the monitor 500. When a wildfire 15 is in the vicinity of the monitor 500, the processor 619 may increase a frequency at which measurements are taken by the sensors to monitor the intensified weather generated by the fire itself and help firefighters maneuver within a fire zone without getting trapped inside. The power source 626 supplies power to the components of the monitor 500, such as the sensors, the transceiver 615, and the processor 619. The power source 219 may include, for example, external accompanying solar panels 700 or low voltage distribution lines (e.g., street light power lines). The power source 626 may also charge a battery 627 to provide power for the monitor 500 during periods when power from the power source 626 is unavailable (e.g., due to a lack of sunshine or during red flag warning periods when power to utility lines is off).

Figure 8:
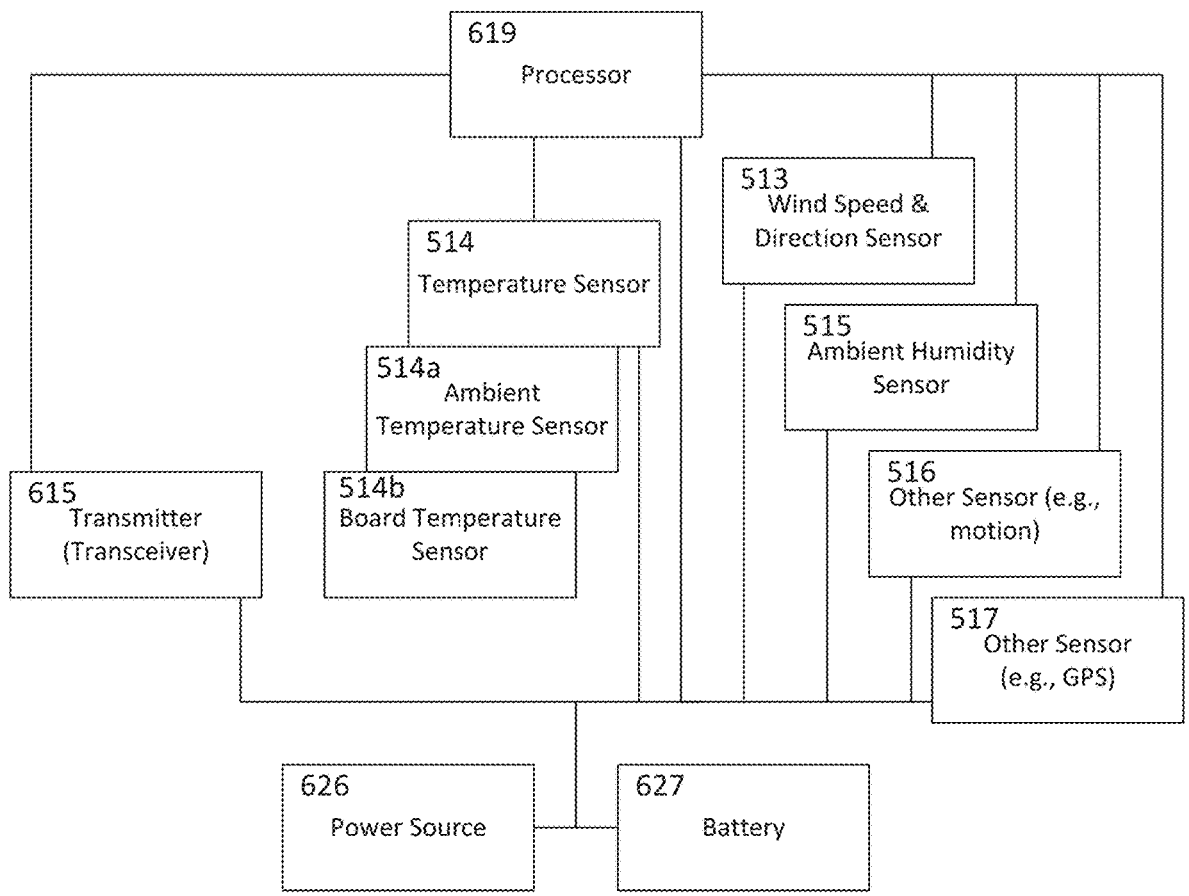
FIG. 8 is a block diagram of components and their connections of a fire weather condition monitor, according to one or more embodiments of the present disclosure.

Referring to FIG. 8, a block diagram of the components and their connections in a fire weather condition monitor, according to an embodiment of the present invention, is shown. In an embodiment, the components may include a wind speed and direction sensor 513, a temperature sensor 514 (which may further include an ambient temperature sensor 514a configured to measure a temperature of the air in the vicinity of the monitor 500 and/or a board temperature sensor 514b configured to measure a temperature of a circuit board internal to the monitor 500), an ambient humidity sensor 515, and other sensors, for example, a motion sensor 516 and/or a GPS sensor 517. The power source 626 and/or the battery 627 supply power to each of the other components. The processor 619 is also connected to each of the other components, to coordinate their readings, transmissions, etc.

Overhead electrical power lines are ubiquitous in both rural and urban environments. Embodiments of the present invention provide for a monitor, method, and network of monitors configured to detect local wind speed, wind direction, humidity, temperature, and other conditions along power lines and elsewhere to report much more precise and detailed weather information regarding possible fire-prone areas and local weather conditions in active fires (e.g., fire weather conditions) than would be possible with broader sources of weather date (e.g., airport-based weather stations).

Figure 9:
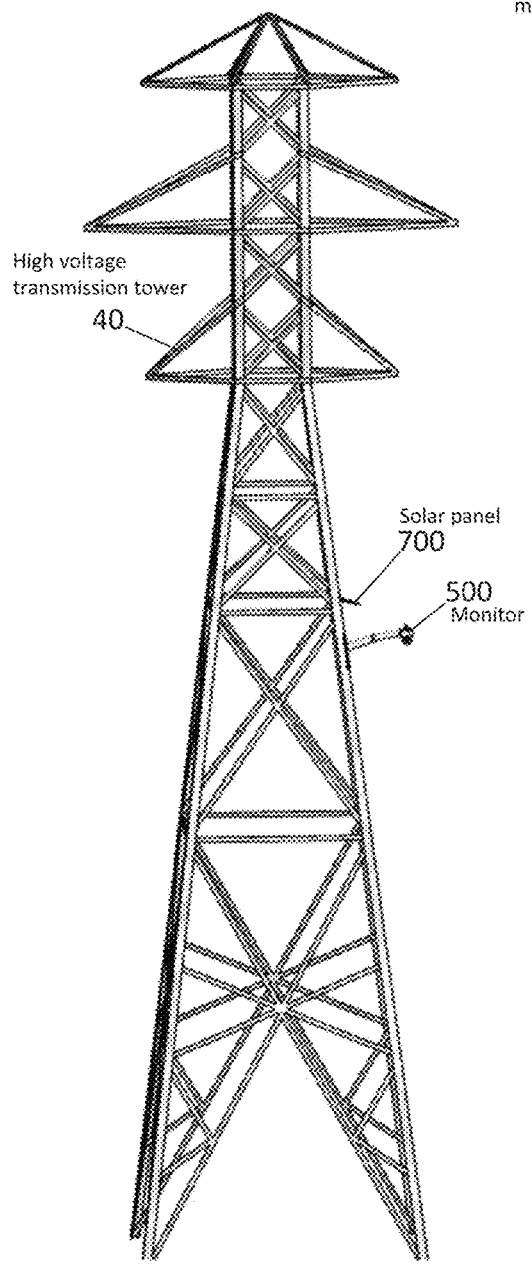
FIG. 9 is an illustration of a fire weather condition monitor and an accompanying solar panel-power source mounted to a high voltage transmission tower, according to one or more embodiments of the present disclosure.
Figure 10:
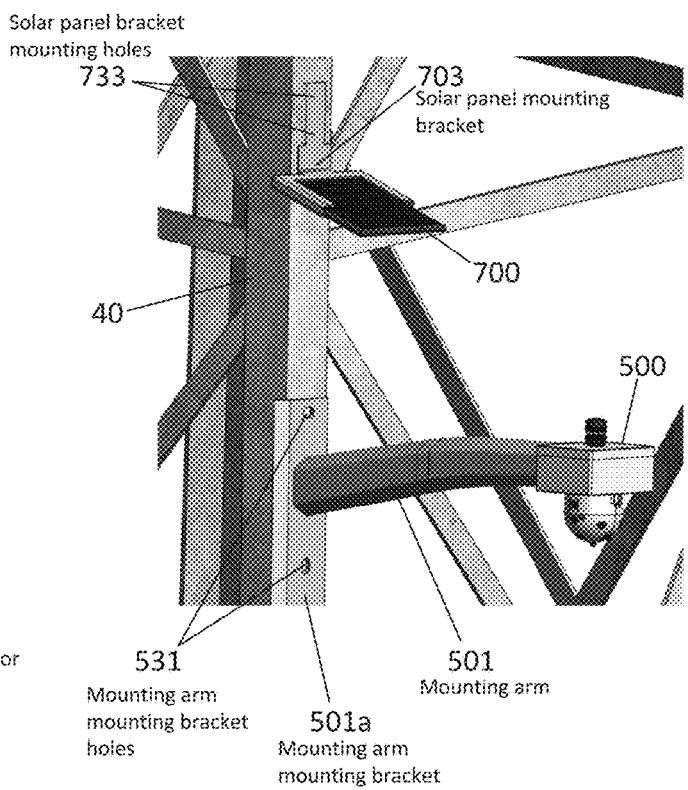
FIG. 10 is an enlarged view of a region of the fire weather condition monitor and the accompanying solar-panel power source of FIG. 9, according to one or more embodiments of the present disclosure.

Referring to FIG. 9, in some embodiments, a monitor 500 may be mounted to a high voltage transmission tower (e.g., a lattice tower) 40 along with an accompanying power source, for example, a solar panel 700. Referring to FIG. 10, the monitor 500 may be attached (e.g., fastened or secured) to a mounting member (e.g., a mounting arm) 501 by way of a mounting member bracket 501a, which may, in turn, be attached to a high voltage transmission tower (e.g., a lattice tower) 40 by way of another mounting member bracket 501b. Each mounting member bracket 501a and 501b may have a plurality of mounting holes 531 for fastening (e.g., securing) the mounting member brackets respectively to a lattice tower 40 and the monitor 500. In an embodiment, an accompanying power source (e.g., solar panels) 700 may be mounted to the same lattice tower 40 as the monitor 500 by a solar panel mounting bracket, which may be secured to the lattice tower 40 by a plurality of mounting holes 533.

Referring to FIG. 11, in some embodiments, a monitor 500 may be mounted to a utility pole (e.g., a wood pole supporting distribution lines) 50 along with an accompanying power source, for example, a solar panel 700. Referring to FIG. 12, the monitor 500 may be attached (e.g., fastened or secured) to a mounting member (e.g., a mounting arm) 501 by way of a mounting member bracket 501a, which may, in turn, be attached to a utility pole 50 by way of another mounting member bracket 501b. Each mounting member bracket 501a and 501b may have a plurality of mounting holes 531 for fastening (e.g., securing) the mounting member brackets respectively to a utility pole 50 and the monitor 500. In an embodiment, an accompanying power source (e.g., solar panels) 700 may be mounted to the same utility pole 50 as the monitor 500 by a solar panel mounting bracket, which may be secured to the utility pole 50 by a plurality of mounting holes 533. In another embodiment, distribution lines may be tapped to provide power to the monitor 500 (e.g., similar to powering street lights).

Although the mounting of fire weather condition monitors has been described with respect to utility line support members (e.g., lattice towers and utility poles), the present invention is not limited thereto. For example, in some embodiments a monitor 500 may be mounted to any structure that may provide reasonable support and stability (e.g., any suitable post or other standing structure) 60x (see FIG. 13).

Figure 13:
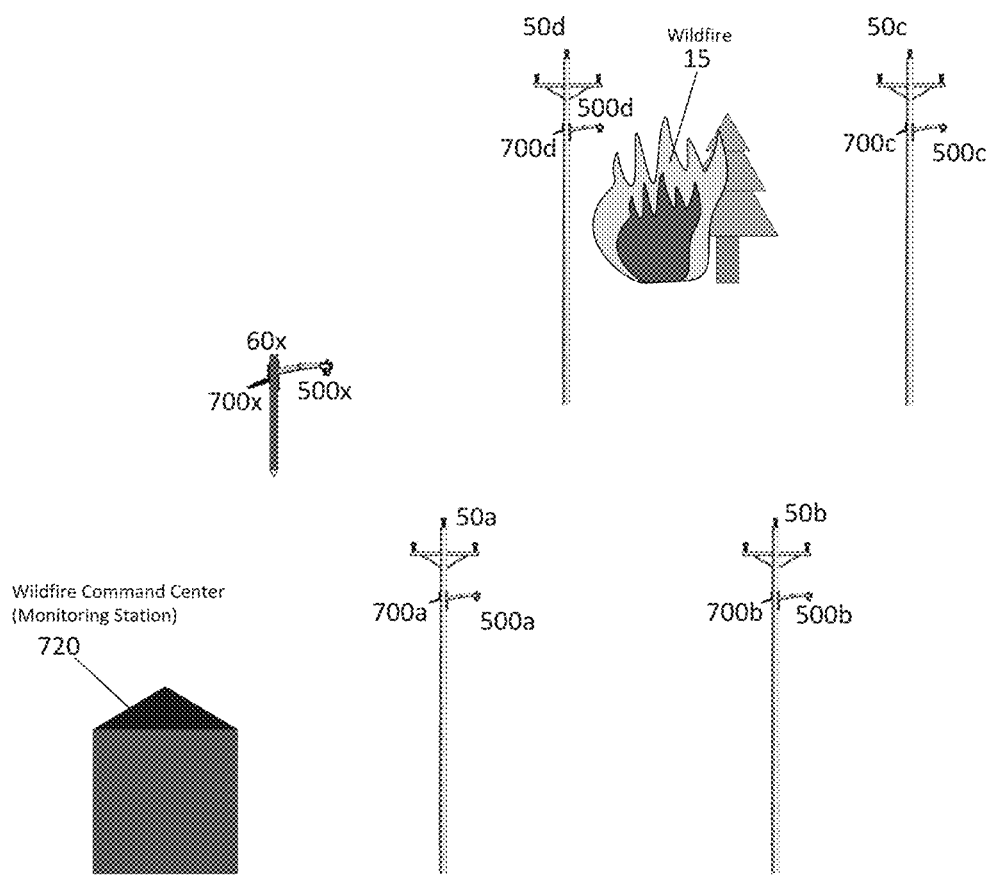
FIG. 13 shows a network of fire weather condition monitors, according to one or more embodiments of the present disclosure.

Referring to FIG. 13, in some embodiments, the monitor 100 may be configured to send warning signals and data to an intended recipient (e.g., a wildfire command center or monitoring station) 720 based on data fusion algorithms, or by request. In some embodiments, the monitor 500 may send communications via satellite or cellular communication channels available on board.

In some embodiments, a transceiver 615 (see FIG. 8) may have a limited broadcast range. For example, when a monitoring station 720 is outside of the transmission range of a transceiver 615 of a monitor 500, other such monitors may receive the alert with their transceivers and retransmit it. For example, a network (or mesh) of suitably spaced (for example, one-quarter mile apart) monitors can transmit an alert in daisy-chain fashion to neighboring monitors (e.g., along the length of a transmission line) to the monitoring station 720 or another suitable recipient of the alert (e.g., a more powerful transmitter, or a communication line).

For example, a monitoring station 720 may be within the transmission range of both monitors 500a and 500b, but not of monitors 500c and 500d, which are in the vicinity of a wildfire 15. However, both monitors 500a and 500b may be in transmission range of monitors 500c and 500d. Thus, monitors 500c and 500d could relay a message to the monitoring station 720 by transmitting a message to one or both of monitors 500a or 500b, with one or both of monitors 500a or 500b receiving and retransmitting the message to the monitoring station 720. It should be noted that, in this case, the monitors 500c and 500d can relay a message to the monitoring station 720, even if one of monitors 500a or 500b was "offline" (e.g., not capable of retransmitting messages from other monitors). Thus, the network may have a certain amount of redundancy or fault tolerance built into it. In some embodiments, a monitor 500x may be mounted to a non-utility standing structure 60x. If the monitors 500d and 500c were not in transmission range of the monitors 500a and 500b (e.g., in addition to not being in transmission range of the monitoring station 720), the monitor 500x could be allocated to bridge the transmission-range gap between the monitor 500c or 500d and at least one of the monitoring station 720, the monitor 500a, and the monitor 500b, either permanently or temporarily (e.g., during a red flag warning period). Further, in some embodiments, the transmission range of the monitors may be considerably farther, which may allow room for more redundancy in cases such as transmitter failure, or for variance in transmission ranges (of the transmitters) among the monitors or variance in the distance between monitors, without compromising the network.

The message relaying may be controlled and coordinated. For example, each message (e.g., alert) from a monitor can be identified and time-stamped from that monitor. That way, when another monitor in the network receives the message, that receiving monitor can detect if it has received (and retransmitted) that message already and, if not, retransmit the message for other monitors in the network to receive. This promotes distribution of the message throughout the network and without unnecessary retransmissions of the message. Still other protocols (e.g., notifying the sender or other interested monitors of the receipt of a message by an intended recipient) may be built into the communications to make them more robust and ensure that the messages reach their intended recipients and without using excessive communication resources.

Referring to FIG. 14, tasks of a method 800 of dynamic real time fire weather condition monitoring according to an embodiment of the present invention are shown. In some embodiments, the method 800 of dynamic real time fire weather condition monitoring includes a task 801 of installing a monitor 500 on a mounting structure (e.g., a lattice tower 40, a utility pole 50, or another standing structure 60x).

In some embodiments, the method 800 includes a task 802 of installing an external power source (e.g., solar panels 700 or distribution lines) on the mounting structure in proximity to the monitor 500 for powering the monitor 500.

In some embodiments, the method 800 includes a task 803 of powering the monitor 500 by either the external power source or a battery 627 of the monitor 500.

In some embodiments, the method 800 includes a task 804 of sensing an ambient temperature in the vicinity of the monitor 500.

In some embodiments, the method 800 includes a task 805 of sensing an ambient humidity in the vicinity of the monitor 500.

In some embodiments, the method 800 includes a task 806 of sensing a wind speed and/or wind direction in the vicinity of the monitor 500.

In some embodiments, the method 800 includes a task 807 of sensing a motion of a heat source in the vicinity of the monitor 500.

In some embodiments, the method 800 includes a task 808 of transmitting a signal to a monitoring station 720.

In some embodiments, the method 800 includes a task 809 of transmitting a signal to another monitor 500.

In some embodiments, the method 800 includes a task 810 of monitoring information transmitted to the monitoring station 720.

While in some embodiments, the method 800 of dynamic real time fire weather condition monitoring may include each of the tasks described above and shown in FIG. 14, in other embodiments of the present invention, in a method of dynamic real time fire weather condition monitoring, one or more of the tasks described above and shown in FIG. 14 may be absent and/or additional tasks may be performed. Further, in the method 800 of dynamic real time fire weather condition monitoring according to one embodiment, the tasks may be performed in the order depicted in FIG. 14. However, the present invention is not limited thereto and, in a method of dynamic real time fire weather condition monitoring according to other embodiments of the present invention, the tasks described above and shown in FIG. 14 may be performed in any other suitable sequence.

Figure 15:
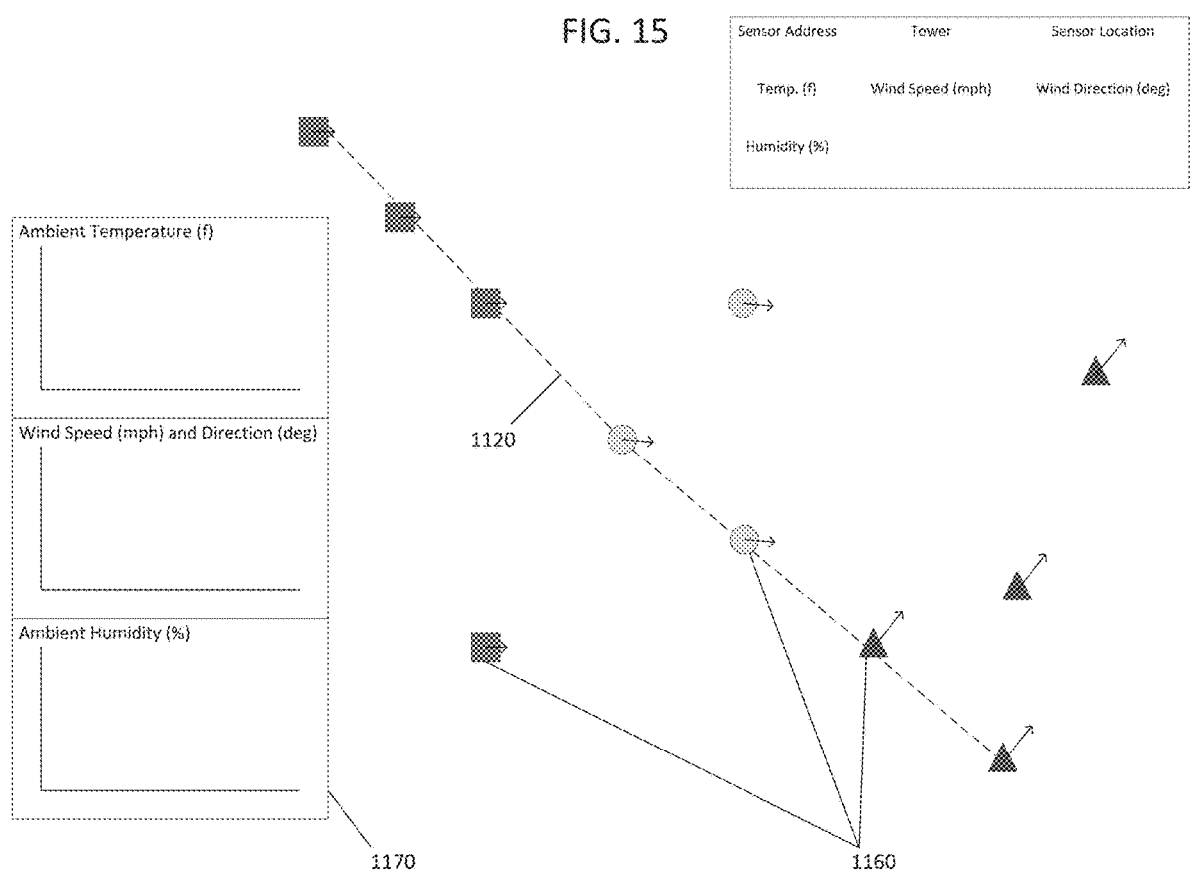
FIG. 15 shows a graphical depiction of the status of fire weather condition monitors in a network of such monitors, according to one or more embodiments of the present disclosure.

FIG. 15 is an illustration of a graphical depiction of the status of the fire weather condition monitors in an example network of such monitors, according to one or more embodiments of the present invention.

Referring to FIG. 15, the monitors are shown on a topographic map as status shapes 1160 corresponding to their locations and status. The statuses can be represented, for example, as different sizes, shapes, shades, or colors (e.g., square="no fire weather conditions," circle="one or more fire weather conditions are met," triangle="all fire weather conditions are met"). There may be different displays for different sensors (such as ambient temperature, wind speed and direction, and ambient humidity). For example, a display for ambient humidity may use three different shapes: square for greater than 40% humidity, circle for between 40% and 20%, and triangle for 20% or less.

Also shown in FIG. 15 is an illustration of a graphical depiction 1170 over time of the status of one or more monitors. For example, different types of measurements for multiple monitors may be graphically displayed having one axis (e.g., the horizontal axis) representing time, and another axis (e.g., the vertical axis) representing a sensor measurement (e.g., ambient humidity), with lines connecting the measurements of one device over time and different lines representing different devices.

While the imaging device 100, the device 200 for detection of electrical arcs, the device 300 for fire detection, the device 400 for detection of weather conditions, and the fire weather condition monitor 500 have been shown and described separately herein, in one or more embodiments, one or more of the cameras, sensors, and/or other components of the various embodiments may be combined in a same device.

Although some example embodiments have been described herein, those skilled in the art will readily appreciate that various modifications are possible in the example embodiments without departing from the spirit and scope of the present disclosure. It is to be understood that descriptions of features or aspects within each embodiment should typically be considered as available for other similar features or aspects in other embodiments, unless otherwise described. Therefore, it is to be understood that the foregoing is illustrative of various example embodiments and is not to be construed as limited to the specific example embodiments disclosed herein, and that various modifications to the disclosed example embodiments, as well as other example embodiments, are intended to be included within the spirit and scope of the present disclosure as set forth in the appended claims, and their equivalents.

What is claimed is:

1. An imaging device for use in a system for debris detection and integrity validation of a right-of-way based infrastructure, the imaging device comprising:
　a first camera configured to capture images of a first portion of the right-of-way based infrastructure, the first camera being directed toward a first direction;
　a second camera configured to capture images of a second portion of the right-of-way based infrastructure, the second camera being directed toward a second direction opposite the first direction; and
　a processing circuit configured to:
　　receive data from the first camera;
　　associate a first image captured by the first camera at a first time with a "before" designation;
　　associate a second image captured by the first camera at a second time with an "after" designation; and
　　transmit the first image and the second image to an electronic device configured to allow a user to compare the first image to the second image, and
　　receive data from the second camera;
　　associate a third image captured by the second camera at the first time with a "before" designation;
　　associate a fourth image captured by the second camera at the second time with an "after" designation; and transmit the third image and the fourth image to the electronic device configured to allow a user to compare the third image to the fourth image, wherein the processing circuit is configured to direct the first camera to capture the images of the first portion of the right-of-way based infrastructure and direct the second camera to capture the images of the second portion of the right-of-way based infrastructure based on a first condition of the right-of-way based infrastructure and to direct the first camera to stop capturing the images of the first portion of the right-of-way based infrastructure and direct the second camera to or stop capturing the images of the second portion of the right-of-way based infrastructure based on a second condition of the right-of-way based infrastructure.

2. The imaging device of claim 1, wherein the right-of-way based infrastructure is a power line.

3. The imaging device of claim 2, further comprising a magnetic field harvesting power supply configured to obtain power from the power line to power the imaging device.

4. The device of claim 3, further comprising a battery that is chargeable by the power obtained by the magnetic field harvesting power supply.

5. The imaging device of claim 1, further comprising at least one of an RF detector or a microphone.

6. The imaging device of claim 5, wherein the processing circuit is further configured to:
receive data from the at least one of the RF detector or the microphone;
associate first information detected by the at least one of the RF detector or the microphone at a first time with a "before" designation;
associate second information detected by the at least one of the RF detector or the microphone at a second time with an "after" designation; and
transmit the first information and the second information to an electronic device configured to allow a user to compare the first information to the second information.

7. The imaging device of claim 1, further comprising an ozone detector.

8. The imaging device of claim 1, further comprising at least one of an infrared sensor or a thermal sensor.

9. The imaging device of claim 8, wherein the processing circuit is further configured to:
receive data from the at least one of the infrared sensor or the thermal sensor;
associate first information detected by the at least one of the infrared sensor or the thermal sensor at a first time with a "before" designation;
associate second information detected by the at least one of the infrared sensor or the thermal sensor at a second time with an "after" designation; and
transmit the first information and the second information to an electronic device configured to allow a user to compare the first information to the second information.

10. A method of capturing and comparing images of a right-of-way based infrastructure for debris detection and integrity validation, the method comprising:
capturing images of a first portion of the right-of-way based infrastructure using a first camera of an imaging device, the first camera being directed toward a first direction;
capturing images of a second portion of the right-of-way based infrastructure using a second camera of the imaging device, the second camera being directed toward a second direction opposite the first direction; and
transmitting a first image and a second image to an electronic device configured to allow a user to compare the first image to the second image, wherein a processing circuit of the imaging device:
receives data from the first camera;
associates the first image captured by the first camera at a first time with a "before" designation;
associates the second image captured by the first camera at a second time with an "after" designation;
receives data from the second camera;
associates a third image captured by the second camera at the first time with a "before" designation; and
associates a fourth image captured by the second camera at the second time with an "after" designation; and the method further comprises transmitting the third image and the fourth image to the electronic device configured to allow a user to compare the third image to the fourth image, wherein the processing circuit is configured to direct the first camera to capture the images of the first portion of the right-of-way based infrastructure and direct the second camera to capture the images of the second portion of the right-of-way based infrastructure based on a first condition of the right-of-way based infrastructure and to direct the first camera to stop capturing the images of the first portion of the right-of-way based infrastructure and direct the second camera to stop capturing the images of the second portion of the right-of-way based infrastructure based on a second condition of the right-of-way based infrastructure.

11. The method of claim 10, wherein the right-of-way based infrastructure is a power line.

12. The method of claim 11, further comprising mounting the imaging device on the power line, and obtaining power from the power line to power the imaging device using a magnetic field harvesting power supply of the imaging device.

13. The method of claim 12, further comprising charging a battery of the imaging device using the power obtained by the magnetic field harvesting power supply.

14. The method of claim 10, further comprising receiving data from at least one of an RF detector, a microphone, an infrared sensor, or a thermal sensor of the imaging device.

15. The method of claim 10, further comprising receiving data from an ozone detector.

16. The imaging device of claim 1, wherein the processing circuit comprises a controller configured to
direct the first camera to periodically capture the images including the first image when the right-of-way based infrastructure is in a normal operating condition,
direct the first camera to stop capturing the images when the right-of-way based infrastructure is de-energized or out of service,
before re-energizing the right-of-way based infrastructure, capture the second image,
direct the second camera to periodically capture the images including the third image when the right-of-way based infrastructure is in a normal operating condition,
direct the second camera to stop capturing the images when the right-of-way based infrastructure is de-energized or out of service, and
before re-energizing the right-of-way based infrastructure, capture the fourth image.

17. The imaging device of claim 16, wherein the processing circuit is configured to group corresponding pairs of first and second communicated images for remote or automatic determination if any structural changes or physical damage occur to the right-of-way based infrastructure in a time interval between the first time and the second time, and is in communication with an image display software and a database containing all the collected images.

18. The imaging device of claim 17, wherein the database allows for storage of annotations of images or image sets and comparisons of differences in appearance.

19. The imaging device of claim 18, wherein the database allows for logical grouping of the imaging device and another imaging device which are located on a same section of the right-of-way based infrastructure to enable a virtual inspection of the right-of-way based infrastructure by examining the image sets in an order in which the imaging device and the another imaging device are arranged along the right-of-way based infrastructure.

20. The method of claim 10, wherein the processing circuit of the imaging device
   directs the first camera to periodically capture the images including the first image when the right-of-way based infrastructure is in a normal operating condition,
   directs the first camera to stop capturing the images when the right-of-way based infrastructure is de-energized or out of service,
   before re-energizing the right-of-way based infrastructure, captures the second image,
   directs the second camera to periodically capture the images including the third image when the right-of-way based infrastructure is in a normal operating condition,
   directs the second camera to stop capturing the images when the right-of-way based infrastructure is de-energized or out of service,
   associates a most recent image captured before image capture is stopped as the third image with a "second camera before" designation,
   transmits the "second camera before" image to the electronic device,
   before re-energizing the right-of-way based infrastructure, captures another image,
   associates the another image as the fourth image with a "second camera after" designation, and transmits the "second camera after" image to the electronic device.

* * * * *